(12) United States Patent
Martin et al.

(10) Patent No.: US 12,296,547 B2
(45) Date of Patent: May 13, 2025

(54) CURING TOOL ASSEMBLIES, METHODS, AND SYSTEMS FOR COMPOSITE MANUFACTURING

(71) Applicant: The Boeing Company, Arlington, VA (US)

(72) Inventors: Kariza T. Martin, Altona Meadows (AU); Jason McBain, Werribee (AU)

(73) Assignee: The Boeing Company, Arlington, VA (US)

( * ) Notice: Subject to any disclaimer, the term of this patent is extended or adjusted under 35 U.S.C. 154(b) by 57 days.

(21) Appl. No.: 18/340,212

(22) Filed: Jun. 23, 2023

(65) Prior Publication Data

US 2024/0424749 A1    Dec. 26, 2024

(51) Int. Cl.
*B29C 70/48*    (2006.01)
*B29C 70/44*    (2006.01)

(52) U.S. Cl.
CPC ............ *B29C 70/48* (2013.01); *B29C 70/443* (2013.01)

(58) Field of Classification Search
CPC ..... B29C 43/3642; B29C 43/12; B29C 43/10; B29C 33/0077; B29C 33/0066; B29C 33/0061; B29C 2033/422; B29C 70/48; B29C 70/443
See application file for complete search history.

(56) References Cited

U.S. PATENT DOCUMENTS

| | | | | |
|---|---|---|---|---|
| 2,913,036 A | * | 11/1959 | Smith | B29C 70/443 264/102 |
| 3,146,148 A | * | 8/1964 | Mitchella | B21D 47/00 264/553 |
| 4,560,523 A | * | 12/1985 | Plumley | B29C 70/865 425/389 |
| 4,815,888 A | * | 3/1989 | Stegmeier | E04F 15/14 404/4 |
| 4,880,583 A | * | 11/1989 | Douglas | B29C 70/48 249/117 |
| D312,696 S | * | 12/1990 | Phillips | D25/35 |
| 5,052,906 A | * | 10/1991 | Seemann | B29C 43/203 425/389 |
| 5,236,321 A | * | 8/1993 | Newton | B29C 33/0061 264/258 |
| 5,340,234 A | * | 8/1994 | Rossi | E01C 11/227 405/48 |
| 5,721,034 A | * | 2/1998 | Seemann, III | B29C 70/865 428/76 |

(Continued)

OTHER PUBLICATIONS

European Patent Office, Extended European Search Report, App. No. 24181052 (Dec. 2, 2024).

*Primary Examiner* — Matthew J Daniels
(74) *Attorney, Agent, or Firm* — Walters & Wasylyna LLC

(57) ABSTRACT

A curing tool assembly for composite manufacturing includes a curing tool and a cover plate. The curing tool includes a tool surface that defines a resin channel. The cover plate overlays the resin channel. The cover plate defines openings in fluidic communication with the resin channel. The openings are arranged to provide different flow capacity through different portions of the cover plate along the channel axis. Methods for composite manufacturing with the curing tool assembly are also disclosed. A system for composite manufacturing includes the curing tool, the cover plate, a fluid impervious layer and a differential pressure generator.

20 Claims, 28 Drawing Sheets

(56) References Cited

U.S. PATENT DOCUMENTS

| | | | | |
|---|---|---|---|---|
| 6,090,335 A | * | 7/2000 | McClure | B29C 70/443 |
| | | | | 264/510 |
| 7,258,828 B2 | * | 8/2007 | Fish | B29C 65/54 |
| | | | | 156/286 |
| 10,759,124 B2 | | 9/2020 | Dongre et al. | |
| 10,807,324 B2 | | 10/2020 | Evans et al. | |
| 10,882,263 B2 | | 1/2021 | Osborne et al. | |
| 2008/0044506 A1 | | 2/2008 | Zahlen et al. | |
| 2011/0088161 A1 | * | 4/2011 | Stimpson | A47K 3/405 |
| | | | | 4/613 |
| 2019/0152170 A1 | | 5/2019 | Dongre et al. | |
| 2019/0152171 A1 | | 5/2019 | Howe et al. | |
| 2019/0300141 A1 | | 10/2019 | Song et al. | |

\* cited by examiner

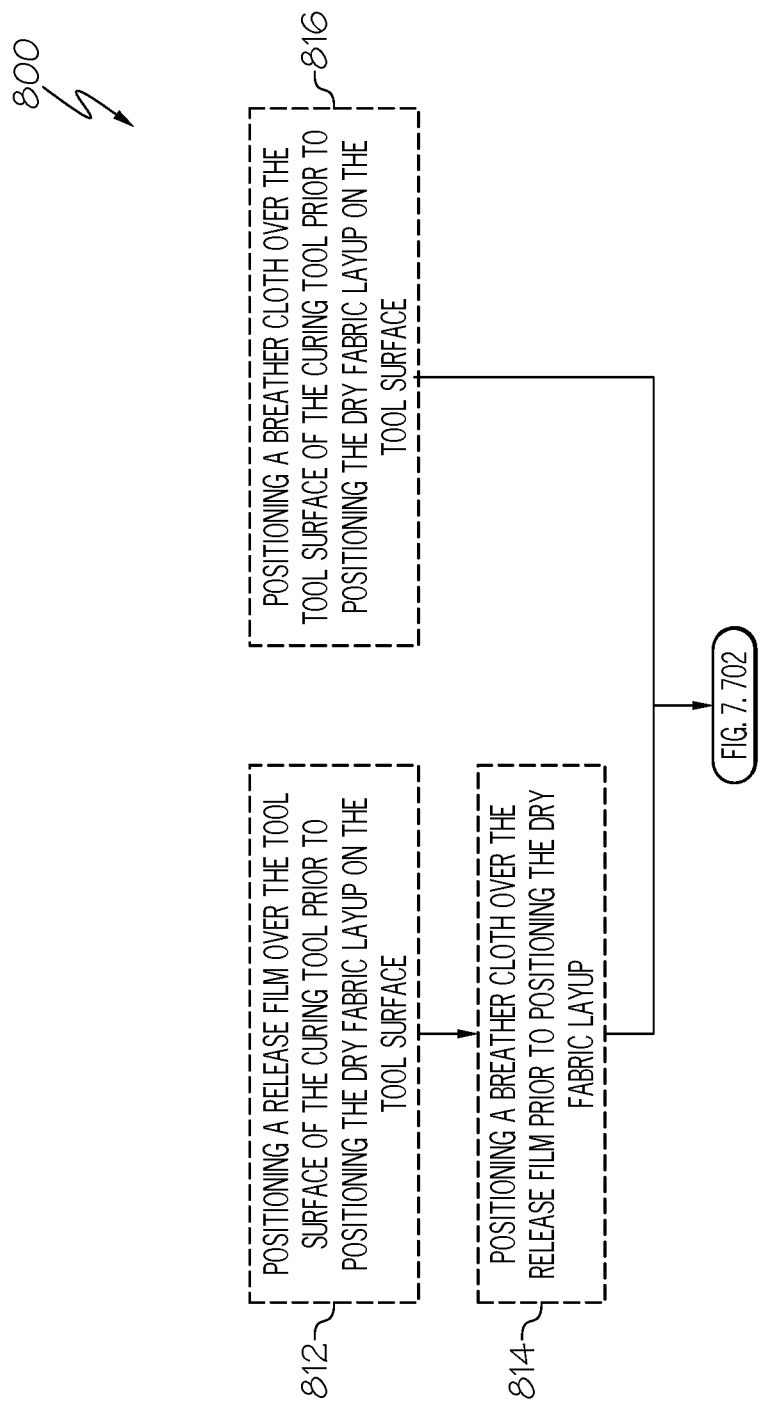

CURING TOOL ASSEMBLIES, METHODS, AND SYSTEMS FOR COMPOSITE MANUFACTURING

FIELD

The present disclosure relates generally to distribution of liquid resin in curing tools during composite manufacturing and, particularly, to using resin channels and channel cover plates to enhance the resin distribution, reduce mark off and mitigate trap off. Various types of cover plates with various types of opening for flow of the resin from the channel to a dry fabric layup. Various widths of cover plates beyond the width of the channel are contemplated to facilitate the resin distribution. Additionally, various systems for composite manufacturing and techniques for controlling the resin distribution are contemplated.

BACKGROUND

Current resin distribution methods for infusion during composite manufacturing use flow media and grooves. These methods require multiple inlets for large scale parts as small cross-sectional areas of the grooves lead to pressure drops as the length of the resin flow increases. The pressure drops can lead to long fill times for the parts. Multiple inlets are used with the flow media and grooves to compensate for the pressure drops but this leads to plumbing complexity. Additionally, strategic placement of resin distribution media (e.g., flow media) or grooves is difficult to achieve due to the reliance of being close to a resin inlet. Large scale parts require the resin distribution method to cover a large surface area of the part to reduce fill time. This is difficult to achieve with grooves due to their limited width for part mark-off. Use of consumable flow media is also a concern for large parts as their manual layup can lead to operator error, surface finish issues, forming challenges and increases in overall production time and cost.

Accordingly, those skilled in the art continue with research and development efforts to improve techniques for resin infusion during composite manufacturing.

SUMMARY

Disclosed are examples of curing tool assemblies, methods and systems for composite manufacturing. The following is a non-exhaustive list of examples, which may or may not be claimed, of the subject matter according to the present disclosure.

In an example, the disclosed curing tool assembly for composite manufacturing includes a curing tool and a cover plate. The curing tool includes a tool surface that defines a resin channel having a channel axis. The cover plate overlays at least a portion of the resin channel along the channel axis. The cover plate defines a plurality of openings in fluidic communication with the resin channel. The plurality of openings is arranged to provide different flow capacity through different portions of the cover plate along the channel axis.

In an example, the disclosed method for composite manufacturing includes: (1) positioning a dry fabric layup with pad-up regions on a tool surface of a curing tool. The tool surface defines a plurality of interconnected resin channels having a channel width and a channel axis. The plurality of interconnected resin channels defines strategic paths for distribution of resin to the dry fabric layup. The dry fabric layup with the pad-up regions is positioned over a plurality of cover plates that overlay the plurality of interconnected resin channels. Each cover plate has a plate width that extends beyond the channel width. Each cover plate includes a plurality of openings, at least a portion of which extend beyond the channel width. The plurality of openings in each cover plate further defines strategic paths for distribution of the resin to the dry fabric layup. The plate width of the plurality of cover plates strategically wider at the pad-up regions than at other regions. In this example, the disclosed method also includes: (2) positioning a fluid impervious layer opposing the tool surface over the dry fabric layup; (3) sealing the fluid impervious layer on the tool surface over the dry fabric layup to form a sealed volume between the fluid impervious layer and the tool surface; (4) supplying a liquid resin from a resin source to the sealed volume; (5) supplying a pressure differential to the sealed volume to flow the liquid resin from the resin source into the sealed volume; (6) directing the liquid resin in the sealed volume to the plurality of interconnected resin channels in response to the differential pressure; and (7) further directing the liquid resin from the plurality of interconnected resin channels through the plurality of openings in the plurality of cover plates to the dry fabric layup with the pad-up regions in further response to the differential pressure.

In another example, the disclosed method for composite manufacturing includes: (1) positioning a dry fabric layup on a tool surface of a curing tool, the tool surface defining a resin channel having a channel axis, the dry fabric layup positioned over a cover plate that overlays the resin channel; (2) positioning a fluid impervious layer opposing the tool surface over the dry fabric layup; (3) sealing the fluid impervious layer on the tool surface over the dry fabric layup to form a sealed volume between the fluid impervious layer and the tool surface; (4) supplying a liquid resin from a resin source to the sealed volume; (5) supplying a pressure differential to the sealed volume to flow the liquid resin from the resin source into the sealed volume; (6) directing the liquid resin in the sealed volume to the resin channel in response to the differential pressure; and (7) further directing the liquid resin from the resin channel through a plurality of openings in the cover plate to the dry fabric layup in further response to the differential pressure, the plurality of openings in the cover plate arranged to provide different flow capacity through different portions of the cover plate to corresponding portions of the dry fabric layup.

In an example, the system for composite manufacturing includes a curing tool, a cover plate, a fluid impervious layer and a differential pressure generator. The curing tool includes a tool surface that defines a resin channel having a channel axis. The resin channel is configured to receive a liquid resin from a resin source. The cover plate overlays at least a portion of the resin channel along the channel axis. The cover plate defines a plurality of openings in fluidic communication with the resin channel. The plurality of openings arranged to provide different flow capacity through different portions of the cover plate along the channel axis. The cover plate and the tool surface configured to receive a dry fabric layup. The fluid impervious layer opposing the tool surface and configured to overlay the dry fabric layup after the dry fabric layup is positioned on the tool surface and the cover plate. The fluid impervious layer configured to be sealed on the tool surface over the dry fabric layup to form a sealed volume between the fluid impervious layer and the tool surface. The differential pressure generator configured to establish a differential pressure within the sealed volume to flow the liquid resin from the resin source into the sealed volume, configured to direct the liquid resin in the sealed volume to the resin channel and configured to further direct the liquid resin from the resin channel through the plurality of openings in the cover plate to the dry fabric layup. The plurality of openings arranged to provide the different flow capacity through the different portions of the cover plate to corresponding portions of the dry fabric layup.

Other examples of the disclosed curing tool assemblies, methods and systems for composite manufacturing will become apparent from the following detailed description, the accompanying drawings and the appended claims.

BRIEF DESCRIPTION OF THE DRAWINGS

FIGS. 8A and 8B, in combination with FIG. 7, is a flow diagram of another example of a method for composite manufacturing;

DETAILED DESCRIPTION

The various examples of curing tool assemblies, methods and systems for composite manufacturing disclosed herein provide control of resin flow by controlling the resin transfer from channels in a mandrel to a preform using different slot widths in cover plates over the channel. The channel increases the resin transfer rate to the preform. The cover plate reduces mark off. The slot width impacts the infusion rate and mitigates trap off. For example, the width of the cover plate, and consequently the reach of slots, can be significantly wider than the channel to increase contact areas between the resin and the part. The cover plates are reusable which may eliminate and/or reduce the need for consumable media during resin infusion depending on the part and other considerations.

Figure 1:
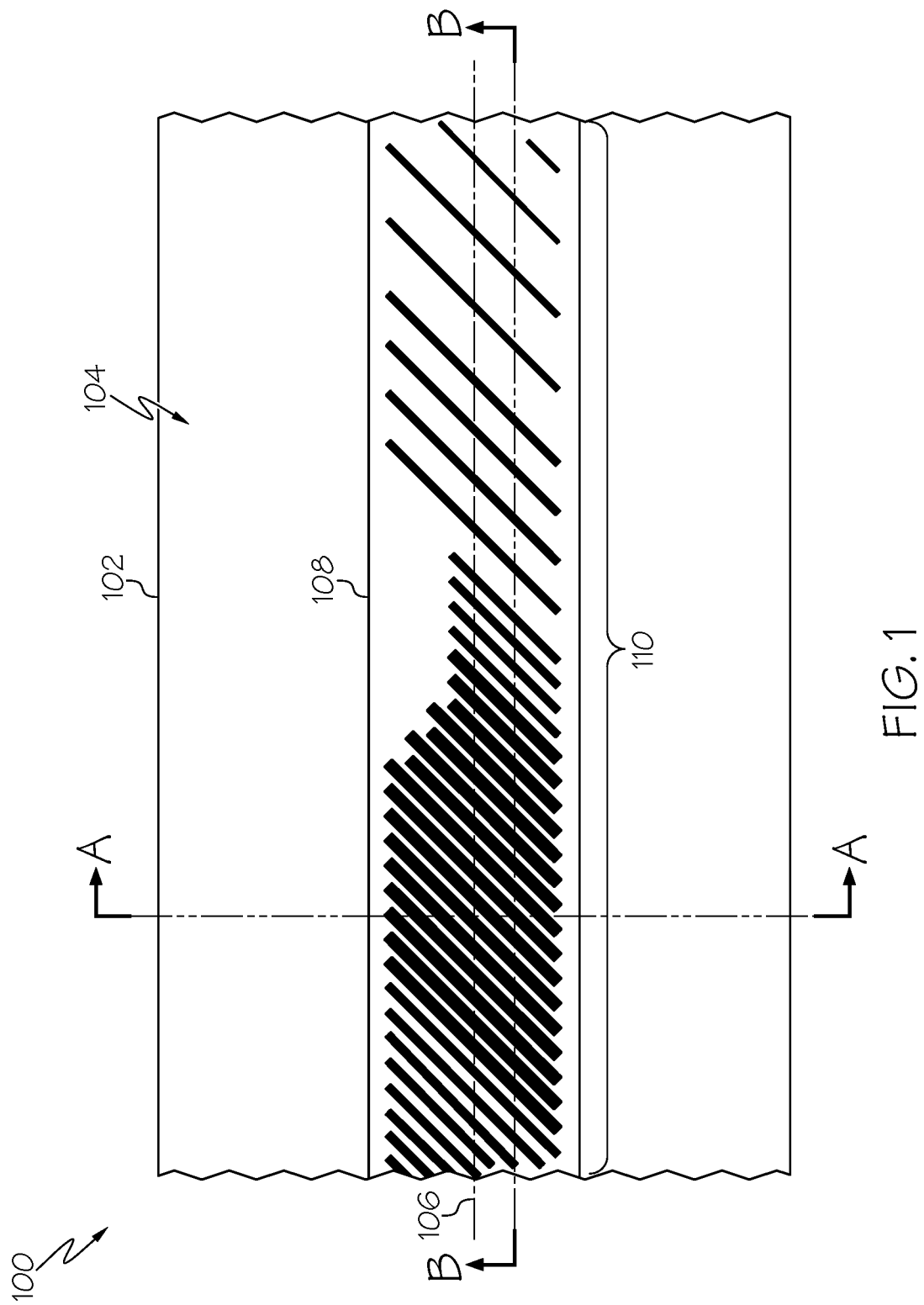
FIG. 1 is a top view of an example of a curing tool assembly for composite manufacturing.
Figure 2:
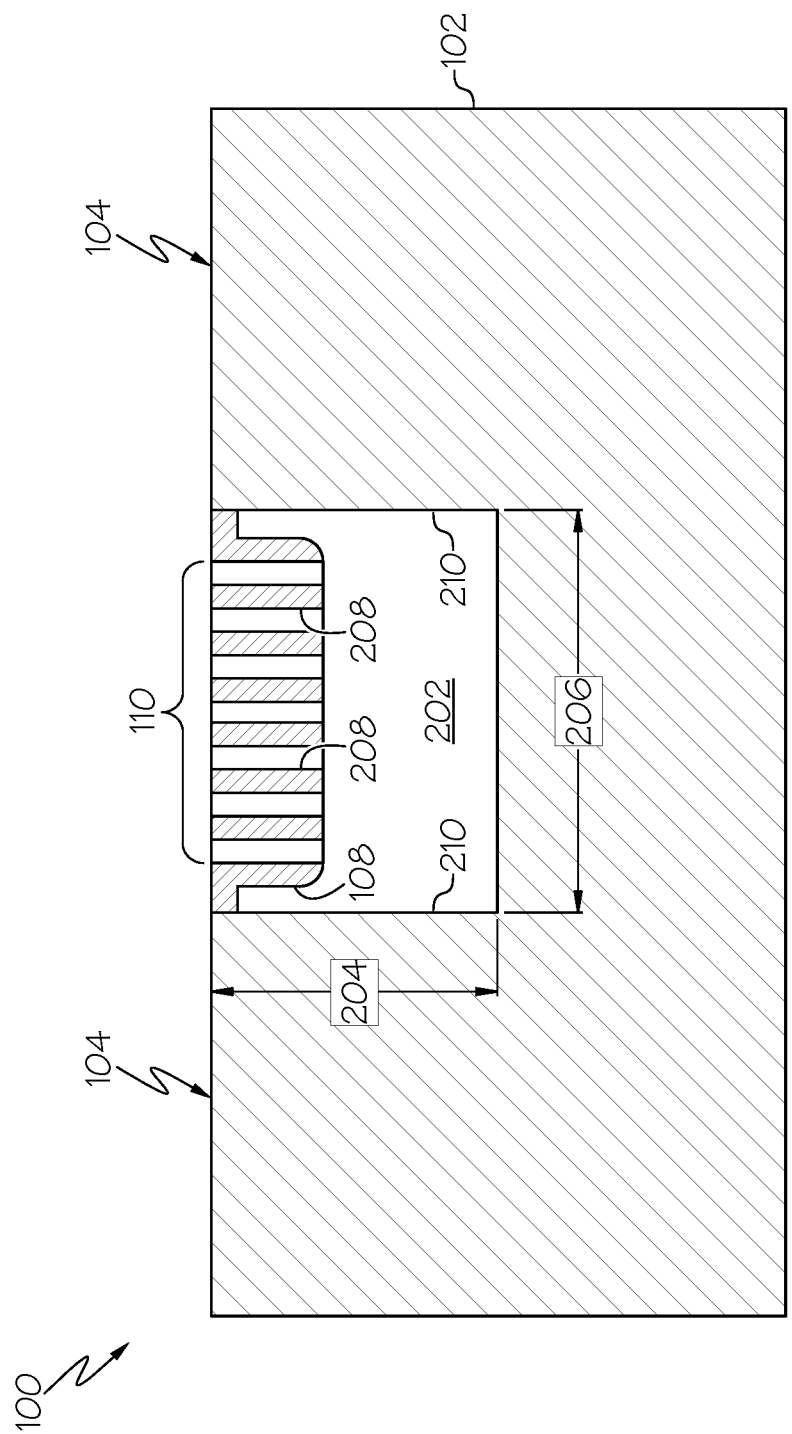
FIG. 2 is an A-A cross-sectional view of an example of the curing tool assembly of FIG. 1.
Figure 3:
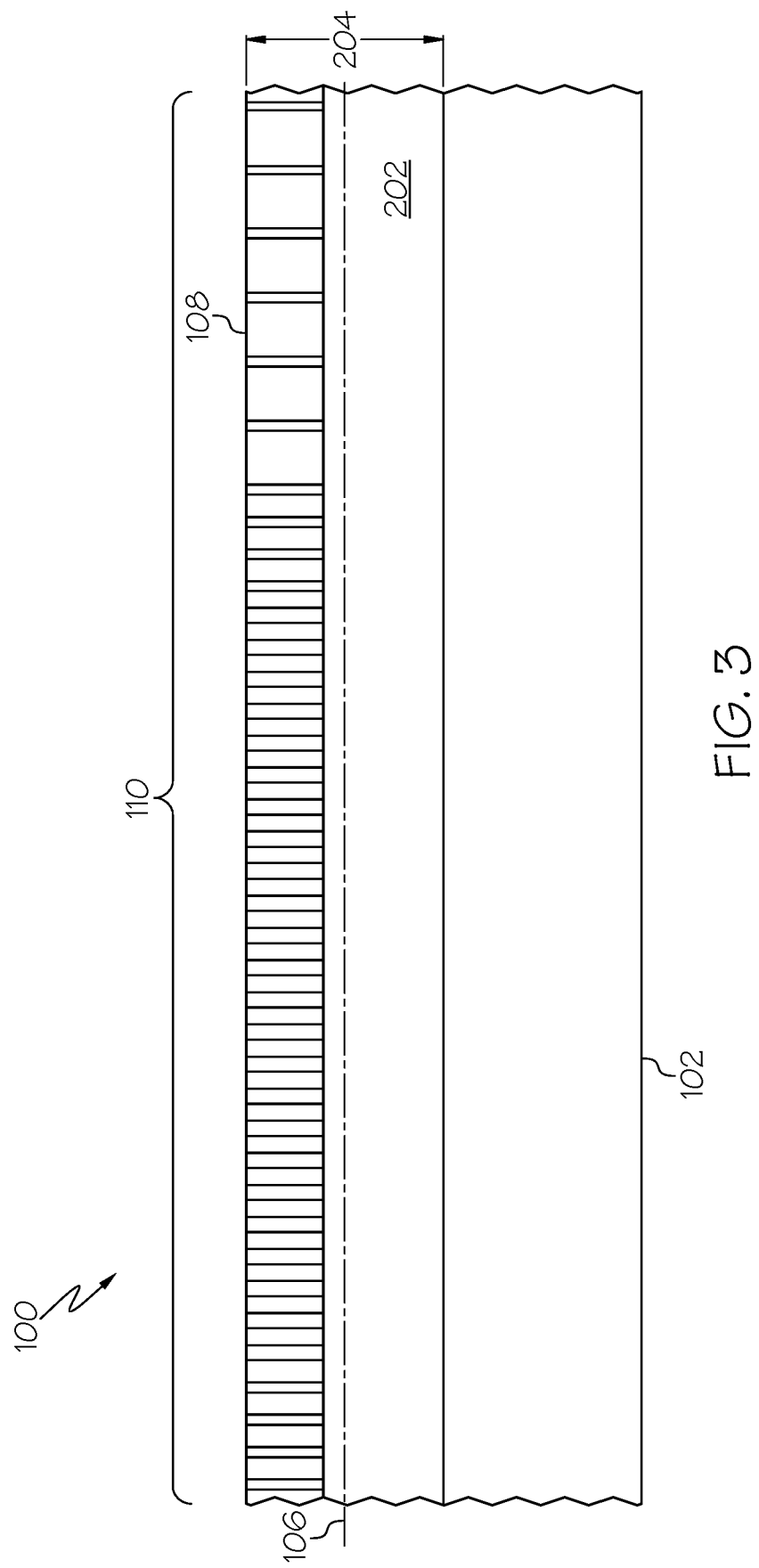
FIG. 3 is a B-B cross-sectional view of an example of the curing tool assembly of FIG. 1.
Figure 4:
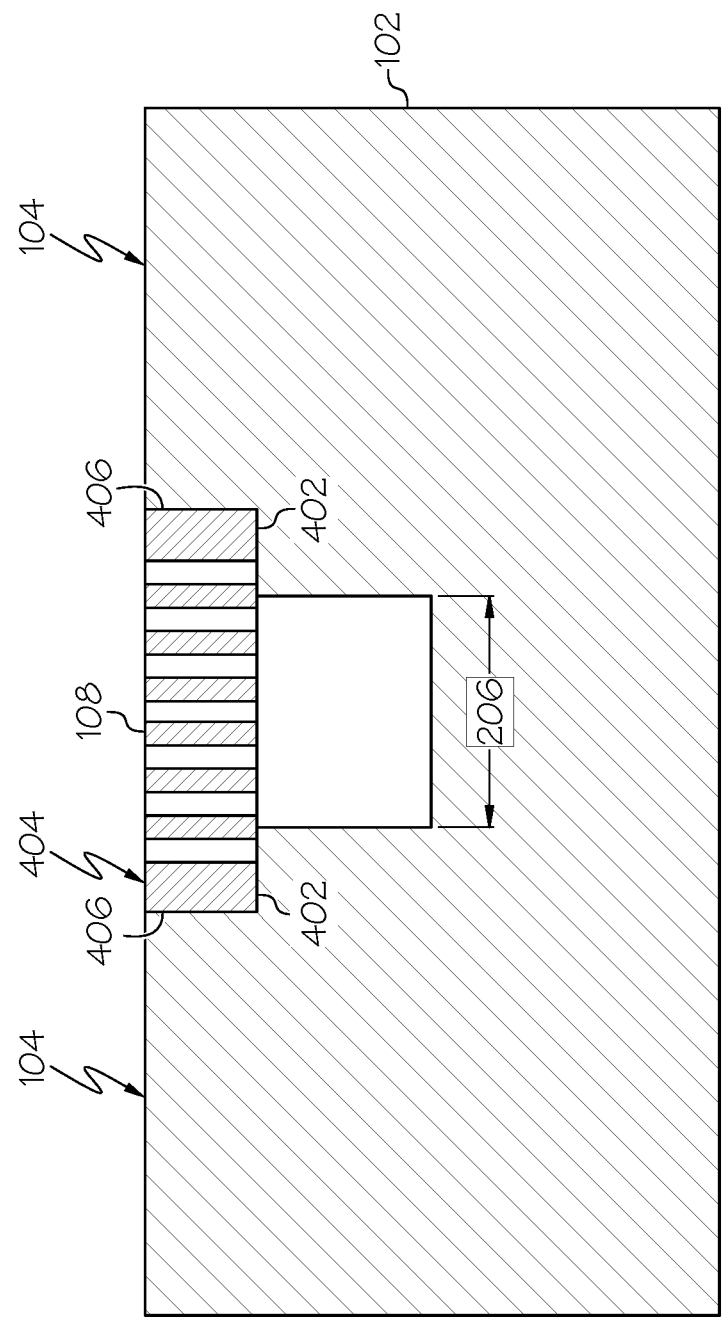
FIG. 4 is an A-A cross-sectional view of an alternate example of the curing tool assembly of FIG. 1.
Figure 5:
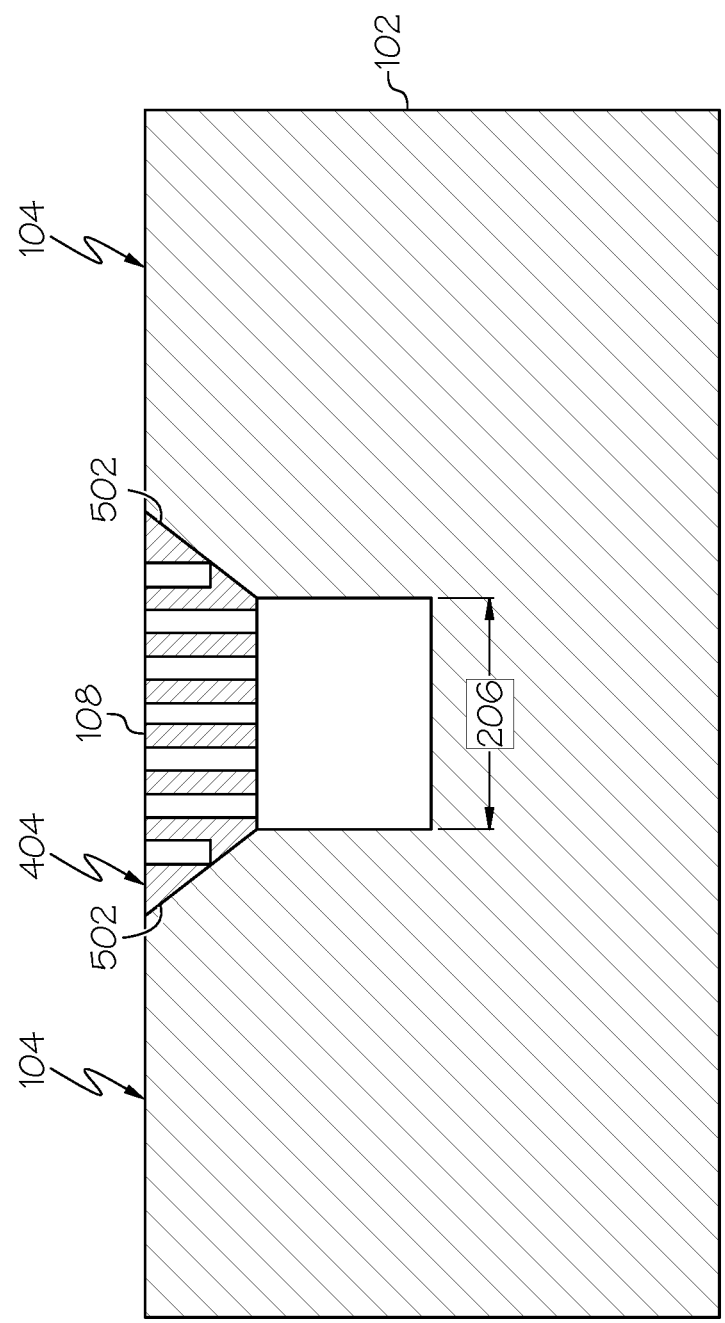
FIG. 5 is an A-A cross-sectional view of another alternate example of the curing tool assembly of FIG. 1.
Figure 6:
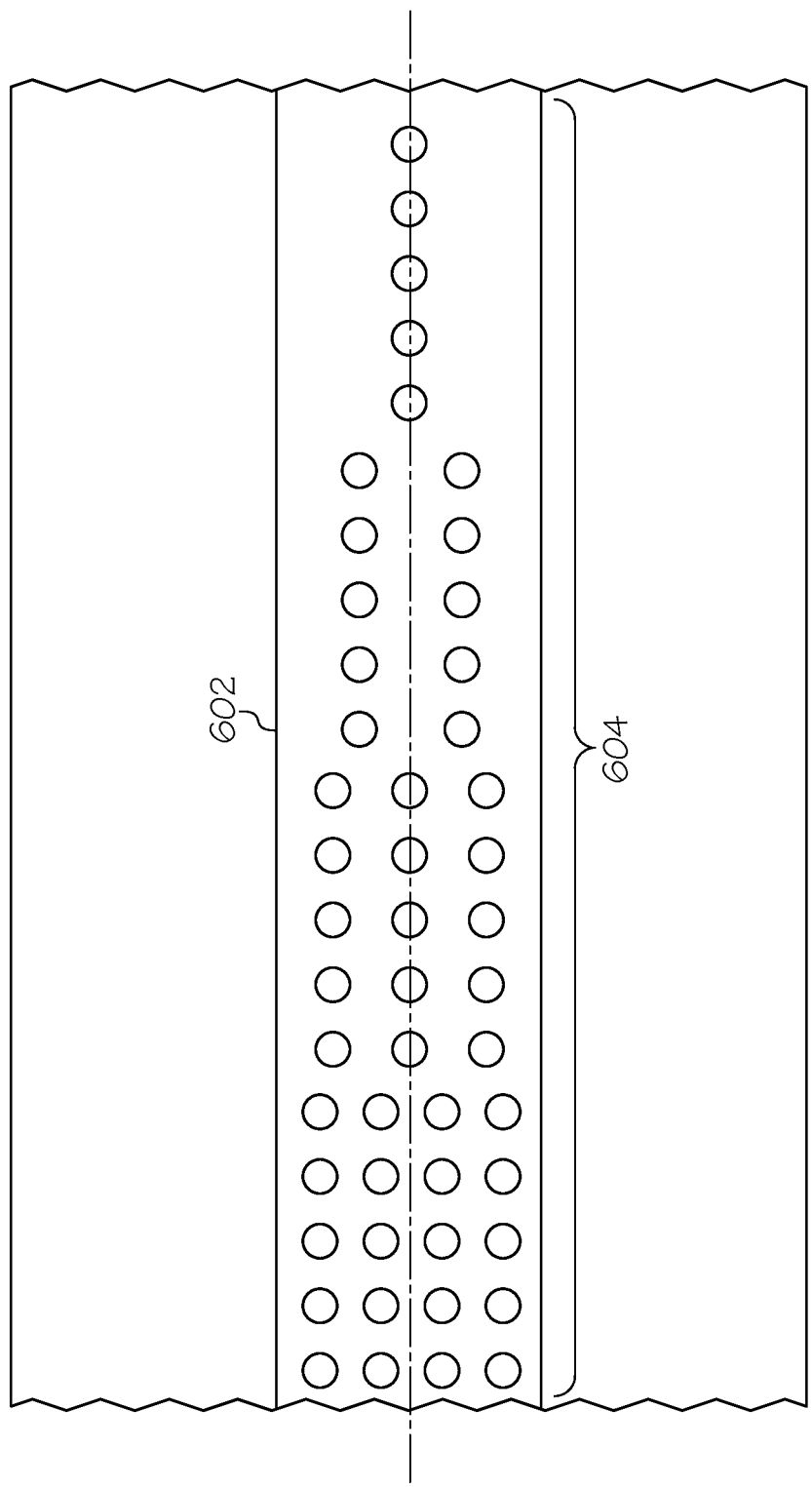
FIG. 6 is a top view of another example of a curing tool assembly for composite manufacturing.

Referring generally to FIGS. 1-6 and 20-25, by way of examples, the present disclosure is directed to a curing tool assembly 100 for composite manufacturing. FIGS. 1 and 6 disclose several examples of the curing tool assembly 100. FIGS. 2, 4 and 5 show examples of several types of the curing tool assembly 100 in cross-sectional views that cross a channel axis 106. FIG. 3 shows the curing tool assembly 100 in a cross-sectional view along the channel axis 106. FIGS. 20-25 disclose several examples of a cover plate 108 for the curing tool assembly 100 with various types of openings 110 in the cover plates 108.

With reference again to FIGS. 1, 2 and 12, in one or more examples, a curing tool assembly 100 for composite manufacturing includes a curing tool 102 and a cover plate 108. The curing tool 102 includes a tool surface 104 that defines a resin channel 202 having a channel axis 106. The cover plate 108 overlaying at least a portion of the resin channel 202 along the channel axis 106. The cover plate 108 defines a plurality of openings 110 in fluidic communication with the resin channel 202. The plurality of openings 110 are arranged to provide different flow capacity through different portions of the cover plate 108 along the channel axis 106. In another example of the curing tool assembly 100, the cover plate 108 is parallel to the channel axis 106 and customized based on predetermined resin flow requirements for a dry fabric layup 1404 in relation to molding a composite part.

In another example of the curing tool assembly 100, each opening 110 of the plurality of openings 110 defines a cross-sectional open area. Accumulative cross-sectional open areas being different for the different portions of the cover plate 108 along the channel axis 106 to provide differences in the flow capacity along the cover plate 108. In a further example, the accumulative cross-sectional open area of a given portion in relation to a maximum accumulative cross-sectional open area for the given portion is less than or equal to approximately 100 percent, approximately 90 percent, approximately 80 percent, approximately 70 percent, approximately 60 percent, approximately 50 percent, approximately 40 percent, approximately 30 percent, approximately 20 percent, approximately 10 percent or any other suitable percentage. In another further example, differences in the accumulative cross-sectional open areas of the different portions of the cover plate 108 are based on differences in the accumulative cross-sectional open areas of groups of openings 110 of the plurality of openings 110 along the channel axis 106. In an even further example, the differences in the groups of openings 110 are based on differences in predetermined resin flow requirements at corresponding locations of a dry fabric layup 1404 in relation to molding a composite part. In another even further example, the accumulative cross-sectional open areas of the different portions of the cover plate 108 are defined by accumulative cross-sectional open areas of the groups of openings 110 in the corresponding portions. The accumulative cross-sectional open areas of the groups of openings 110 being defined by dimensions of specific openings in the corresponding group. In an even yet further example, different accumulative cross-sectional open areas for the different portions of the cover plate 108 result from differences in dimensions of the specific openings from at least a portion of adjacent groups, differences in a quantity of the specific openings from at least a portion of adjacent groups or differences in any other suitable cross-sectional area parameter in any suitable combination. In yet another example of the curing tool assembly 100, at least one dimension of the plurality of openings 110 in the cover plate 108 is different along the channel axis 106. In a further example, differences in the at least one dimension of the plurality of openings 110 are based on differences in predetermined resin flow requirements at corresponding locations of a dry fabric layup 1404 in relation to molding a composite part. In another further example, the at least one dimension of the plurality of openings 110 is different by a width, a length, an angle, a diameter, a depth or any other suitable dimension in any suitable combination.

In yet another further example, the at least one dimension is a width of the plurality of openings 110 and the width ranges from approximately 0.50 inches to approximately 2.25 inches, approximately 0.75 inches to approximately 2.00 inches, approximately 1.00 inches to approximately 1.75 inches, approximately 1.25 inches to approximately 1.5 inches or any other suitable width range in any suitable combination. In a further example, the width of the plurality of openings 110 is based on predetermined resin flow requirements for a dry fabric layup 1404 in relation to molding a composite part to improve a resin infusion rate and to mitigate trap off.

In still another further example, the at least one dimension is a length of the plurality of openings 110 and the length ranges from approximately 0.50 inches to approximately 2.25 inches, approximately 0.75 inches to approximately 2.00 inches, approximately 1.00 inches to approximately 1.75 inches, approximately 1.25 inches to approximately 1.5 inches or any other suitable length range in any suitable combination. In still yet another further example, the at least one dimension is an angle of the plurality of openings 110 and the angle ranges from approximately 5 degrees to approximately 175 degrees, 25 degrees to approximately 155 degrees, approximately 45 degrees to approximately 135 degrees, approximately 65 degrees to approximately 115 degrees, approximately 85 degrees to approximately 95 degrees or any other suitable angle range in any suitable combination. In another further example, the at least one dimension is a diameter of the plurality of openings 110 and the diameter ranges from approximately 0.050 inches to approximately 0.750 inches, approximately 0.100 inches to approximately 0.700 inches, approximately 0.150 inches to approximately 0.650 inches, approximately 0.200 inches to approximately 0.600 inches, approximately 0.250 inches to approximately 0.550 inches, approximately 0.300 inches to approximately 0.500 inches, approximately 0.350 inches to approximately 0.450 inches or any other suitable diameter range in any suitable combination. In yet another further example, the at least one dimension is a depth of the plurality of openings 110 and the depth ranges from at least one of approximately 0.040 inches to approximately 0.100 inches, approximately 0.050 inches to approximately 0.090 inches, approximately 0.060 inches to approximately 0.080 inches or any other suitable depth range in any suitable combination.

In still another example of the curing tool assembly 100, locations of the plurality of openings 110 in the cover plate 108 are different along the channel axis 106. In a further example, differences in the locations of the plurality of openings 110 are based on differences in predetermined resin flow requirements at corresponding locations of a dry fabric layup 1404 in relation to molding a composite part. In another further example, the locations of the plurality of openings 110 are based on different quantities of openings in different portions of the cover plate 108 along the channel axis 106. In an even further example, the quantities of openings in a given portion in relation to a maximum quantity of openings in the given portion is less than or equal to approximately 100 percent, approximately 90 percent, approximately 80 percent, approximately 70 percent, approximately 60 percent, approximately 50 percent, approximately 40 percent, approximately 30 percent, approximately 20 percent, approximately 10 percent or any other suitable percentage in any suitable combination. In yet another further example, the locations of the plurality of openings 110 are based on an array of rows that transverse the channel axis 106 and columns that follow the channel axis 106 and different locations are created by changing a quantity of openings from row-to-row for at least a portion of the plurality of rows.

In still yet another example of the curing tool assembly 100, shapes of the plurality of openings 110 in the cover plate 108 are different along the channel axis 106. In a further example, differences in the shapes of the plurality of openings 110 are based on differences in predetermined resin flow requirements at corresponding locations of a dry fabric layup 1404 in relation to molding a composite part. In another further example, the shapes of the plurality of openings 110 include a rectangular shape (see, e.g., FIG. 25), a square shape, a circular shape (see, e.g., FIGS. 22 and 23), an oval shape, a triangular shape, a hexagonal shape, an octagonal shape, a pentagonal shape, an elongated shape (see, e.g., FIG. 20), a parallelogram shape (see, e.g., FIG. 21), a trapezoidal shape, a curved slit shape (see, e.g., FIG. 24) or any other suitable shape in any suitable combination. In yet another further example, at least a portion of the plurality of openings 110 comprise curved slit openings (see, e.g., FIG. 24) defined by at least one curve radius, at least one width and at least one length. In an even further example, the at least one curve radius of the curved slit openings ranges from approximately 0.050 inches to approximately 0.750 inches, approximately 0.100 inches to approximately 0.700 inches, approximately 0.150 inches to approximately 0.650 inches, approximately 0.200 inches to approximately 0.600 inches, approximately 0.250 inches to approximately 0.550 inches, approximately 0.300 inches to approximately 0.500 inches, approximately 0.350 inches to approximately 0.450 inches or any other suitable curve radius range in any suitable combination. In another even further example, the at least one width of the curved slit openings ranges from approximately 0.50 inches to approximately 2.25 inches, approximately 0.75 inches to approximately 2.00 inches, approximately 1.00 inches to approximately 1.75 inches, approximately 1.25 inches to approximately 1.5 inches or any other suitable width range in any suitable combination. In yet another even further example, the at least one length of the curved slit openings ranges from approximately 0.50 inches to approximately a length of the resin channel 202, approximately 1 inch to approximately 120 inches, approximately 2 inches to approximately 96 inches, approximately 4 inches to approximately 72 inches, approximately 6 inches to approximately 48 inches, approximately 8 inches to approximately 24 inches or any other suitable length range in any suitable combination.

In another example of the curing tool assembly 100, pitches of sidewalls 208 of the plurality of openings 110 in the cover plate 108 are different along the channel axis 106. In a further example, differences in the pitches of the sidewalls 208 of the plurality of openings 110 are based on differences in predetermined resin flow requirements at corresponding locations of a dry fabric layup 1404 in relation to molding a composite part. In another further example, the pitches of the sidewalls 208 of the plurality of openings 110 are different by an angle of the sidewall 208, a slope of the sidewall 208, a depth of the sidewall 208 or any other suitable sidewall parameter in any suitable combination. For example, the pitch of the sidewalls 208 may cause ends of the sidewalls 208 facing the resin channel 202 to be farther apart than at the opposing ends of the sidewalls 208. Conversely, the pitch of the sidewalls 208 may cause ends of the sidewalls 208 facing the resin channel 202 to be closer together than at the opposing ends of the sidewalls 208. In yet another further example, the pitches of the sidewalls 208 of the plurality of openings 110 range from approximately 45 degrees to approximately 90 degrees, approximately 50 degrees to approximately 85 degrees, approximately 55 degrees to approximately 80 degrees, approximately 60 degrees to approximately 75 degrees, approximately 65 degrees to approximately 70 degrees or any other suitable angle range in any suitable combination. The reference point (zero degrees) for the angle ranges is the channel axis.

In yet another example of the curing tool assembly 100, a spacing between adjacent openings of the plurality of openings 110 exceeds approximately 0.0375 inches or any other suitable spacing.

In still another example of the curing tool assembly 100, the resin channel 202 has a channel depth 204 that ranges from approximately 0.15 inches to approximately 0.60 inches, approximately 0.20 inches to approximately 0.50 inches, approximately 0.25 inches to approximately 0.45 inches, approximately 0.30 inches to approximately 0.40 inches or any other suitable channel depth range. In still yet another example of the curing tool assembly 100, the resin channel 202 has a channel width 206 that ranges from approximately 0.20 inches to approximately 0.80 inches, approximately 0.30 inches to approximately 0.70 inches, approximately 0.40 inches to approximately 0.60 inches or any other suitable channel width range in any suitable combination. In another example of the curing tool assembly 100, a location of the resin channel 202 in relation to the curing tool 102 is based on predetermined resin flow requirements for a dry fabric layup 1404 in relation to molding a composite part.

In another example of the curing tool assembly 100, the resin channel 202 has a channel width 206 and the cover plate 108 has a plate width greater than the channel width 206. In this example, at least a portion of the plurality of openings 110 in the cover plate 108 extends beyond the channel width 206. In a further example, the plate width is up to 400 percent of the channel width 206, up to 350 percent of the channel width 206, up to 300 percent of the channel width 206, up to 250 percent of the channel width 206, up to 200 percent of the channel width 206, up to 150 percent of the channel width 206 or any other suitable percentage of the channel width 206 in any suitable combination.

In yet another example of the curing tool assembly 100, the curing tool 102 includes shoulders 402 (see FIG. 4) along both sides 210 of the resin channel 202 at the tool surface 104 for aligning the cover plate 108 with the resin channel 202. In a further example, the cover plate 108 overlays at least a portion of the shoulders 402 such that a plate surface 404 of the cover plate 108 is substantially flush with the tool surface 104. In an even further example, the resin channel 202 has a channel width 206 and the cover plate 108 includes support members 406 that elevate the plate surface 404 above the shoulders 402. In this example, at least a portion of the plurality of openings 110 of the cover plate 108 extend beyond the channel width 206 over the shoulders 402. In an even yet further example, the cover plate 108 provides a fluidic path from the resin channel 202 through the portion of the plurality of openings 110 that extends beyond the channel width 206. The fluidic path being along the shoulders 402 and through the corresponding openings 110.

In still another example of the curing tool assembly 100, the curing tool 102 includes chamfers 502 (see FIG. 5) along both sides 210 of the resin channel 202 at the tool surface 104 for aligning the cover plate 108 with the resin channel 202. In a further example, the cover plate 108 overlays at least a portion of the chamfers 502 such that a plate surface 404 of the cover plate 108 is substantially flush with the tool surface 104. In an even further example, the resin channel 202 has a channel width 206 and at least a portion of the plurality of openings 110 extends beyond the channel width 206 over the chamfers 502. In this example, the cover plate 108 provides a fluidic path from the resin channel 202 through the portion of the plurality of openings 110 that extends beyond the channel width 206. The fluidic path is along the chamfers 502 and through the corresponding openings 110.

In still yet another example, the curing tool assembly 100 also includes a second cover plate 602 configured to overlay a second portion of the resin channel 202 along the channel axis 106. The second cover plate 602 defines a second plurality of openings 604 in fluidic communication with the resin channel 202. The second plurality of openings 604 arranged to provide different flow capacity through different portions of the second cover plate 602 along the channel axis 106. In a further example, the cover plate 108 and the second cover plate 602 overlay different portions of the resin channel 202 along the channel axis 106. In another further example, differences in the flow capacity through the different portions of the second cover plate 602 are based on differences in predetermined resin flow requirements at corresponding locations of a dry fabric layup 1404 in relation to molding a composite part.

In another example, the curing tool assembly 100 also includes a second cover plate 602 configured to overlay at least the portion of the resin channel 202 along the channel axis 106, the second cover plate 602 defining a second plurality of openings 604 in fluidic communication with the resin channel 202. The second plurality of openings 604 arranged to provide different flow capacity through different portions of the second cover plate 602 along the channel axis 106. In a further example, the cover plate 108 and the second cover plate 602 are interchangeable in relation to the curing tool 102 and the resin channel 202. In another further example, differences in the flow capacity through the different portions of the second cover plate 602 are based on differences in predetermined resin flow requirements at corresponding locations of a second dry fabric layup 1404 in relation to molding a second composite part.

Figure 14:
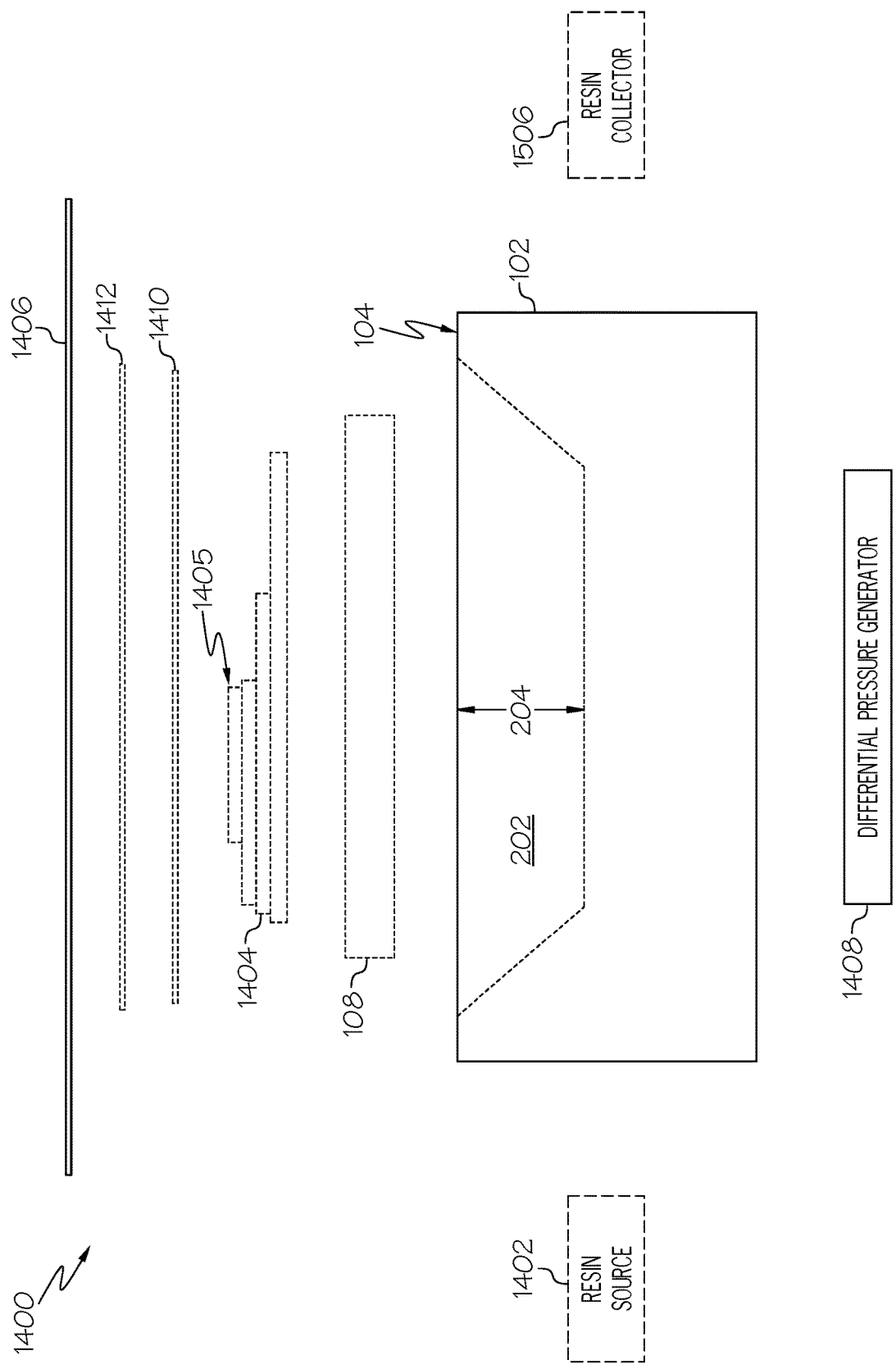
FIG. 14 is a functional diagram of an example of a system for composite manufacturing.
Figure 18:
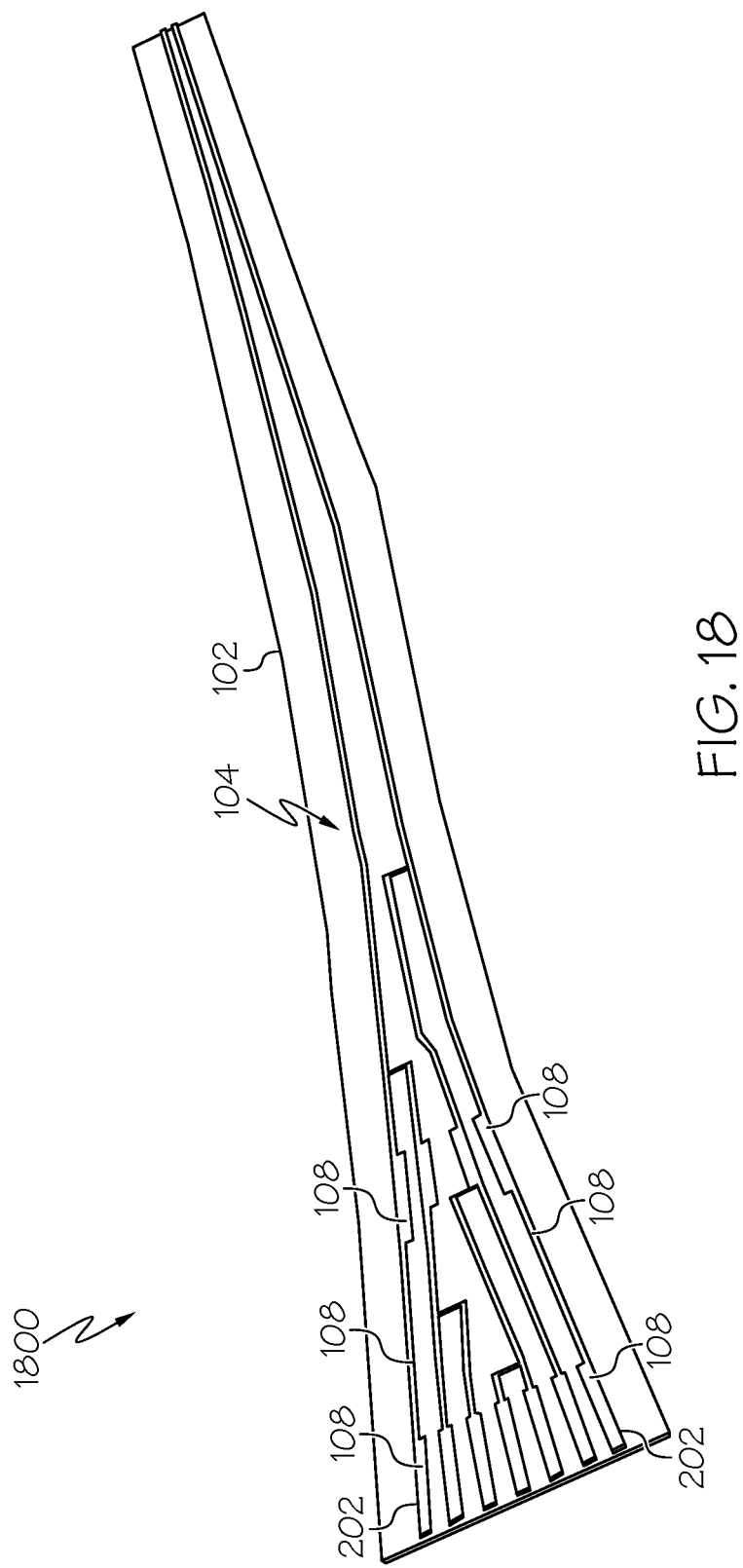
FIG. 18 is a top perspective view of another example of a curing tool assembly for composite manufacturing.
Figure 19:
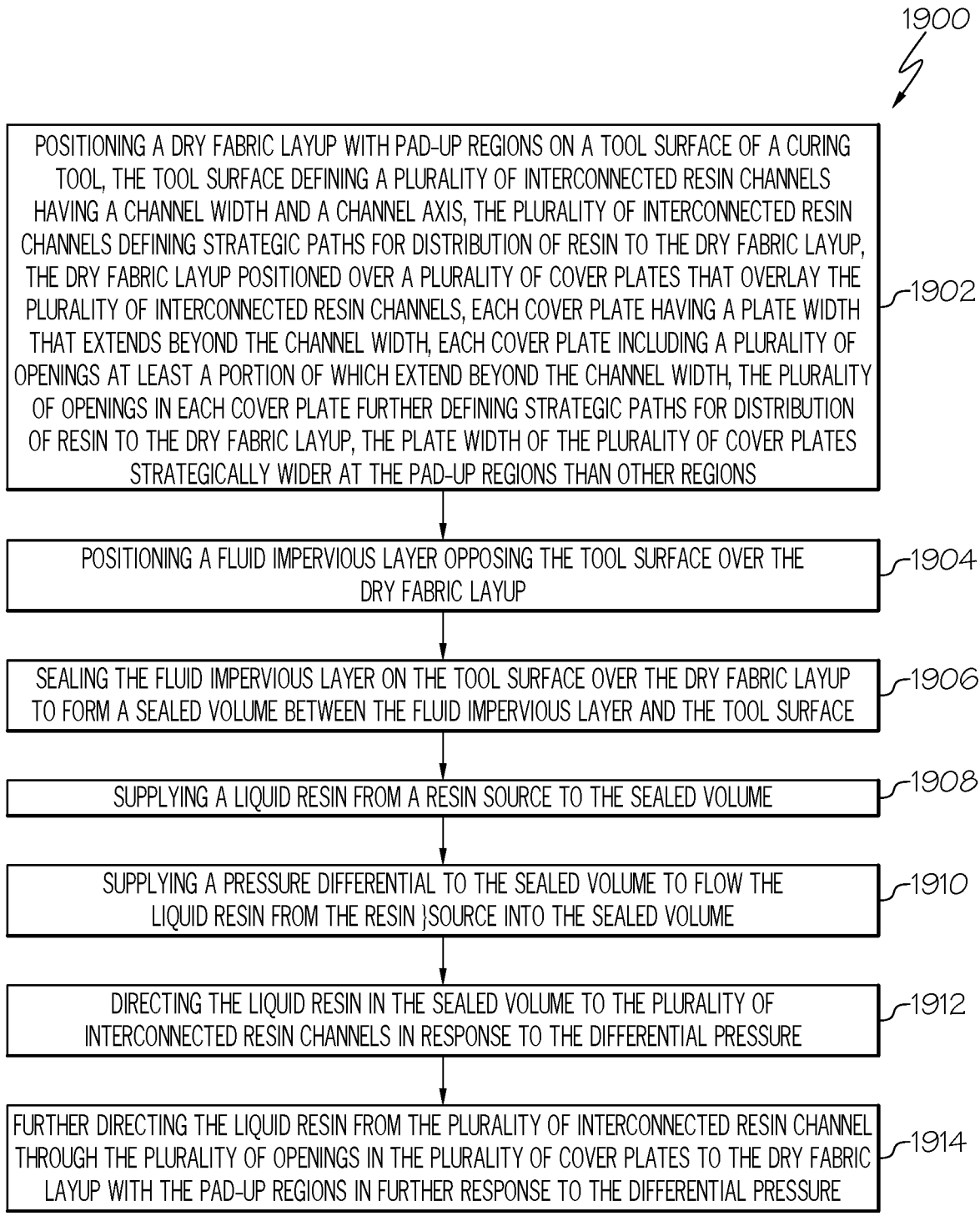
FIG. 19 is a flow diagram of another example of a method for composite manufacturing.
Figure 20:
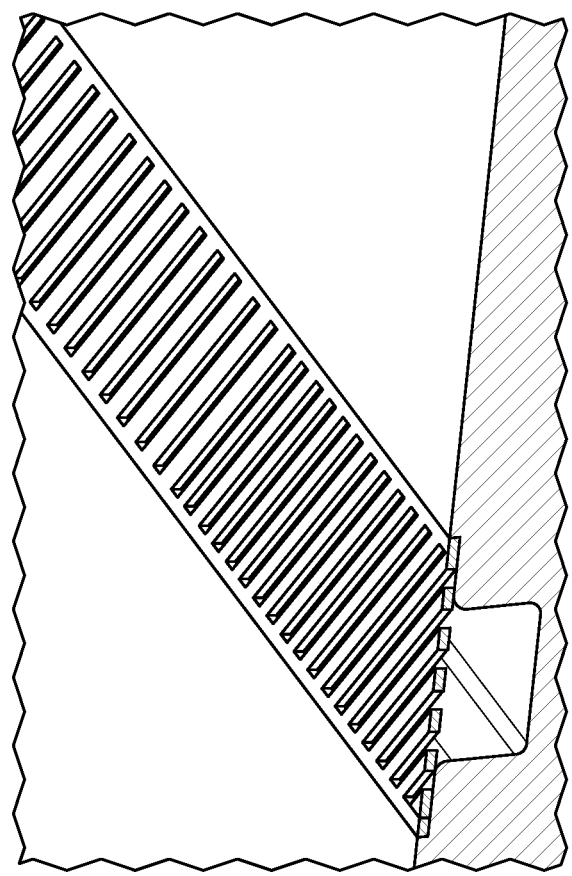
FIG. 20 is a top perspective view of an example of a cover plate for the curing tool assembly of FIG. 1.
Figure 21:
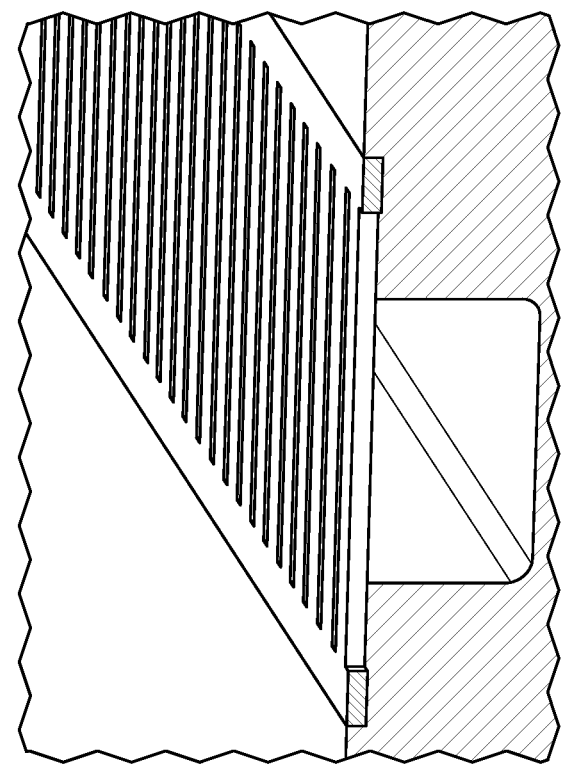
FIG. 21 is a top perspective view of another example of a cover plate for the curing tool assembly of FIG. 1.
Figure 23:
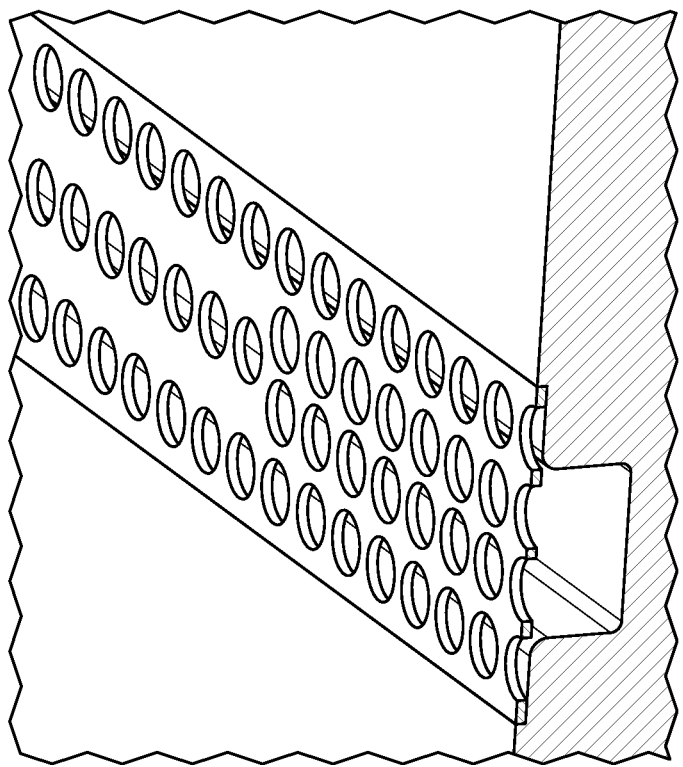
FIG. 23 is a top perspective view of still another example of a cover plate for the curing tool assembly of FIG. 1.
Figure 22:
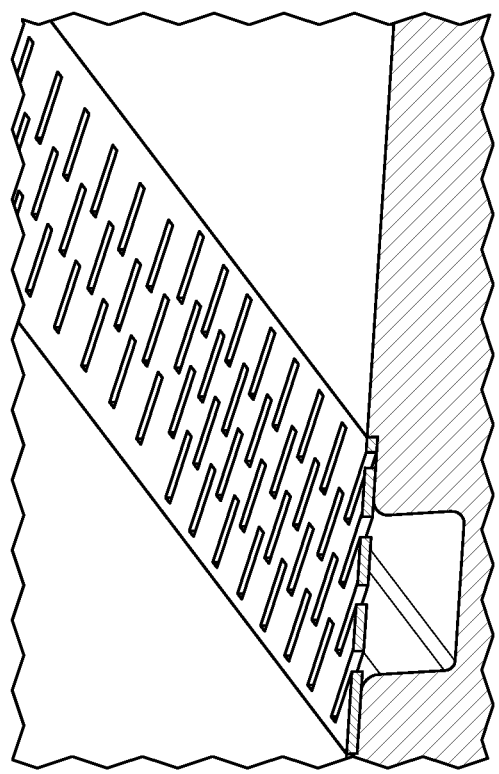
FIG. 22 is a top perspective view of yet another example of a cover plate for the curing tool assembly of FIG. 1.
Figure 25:
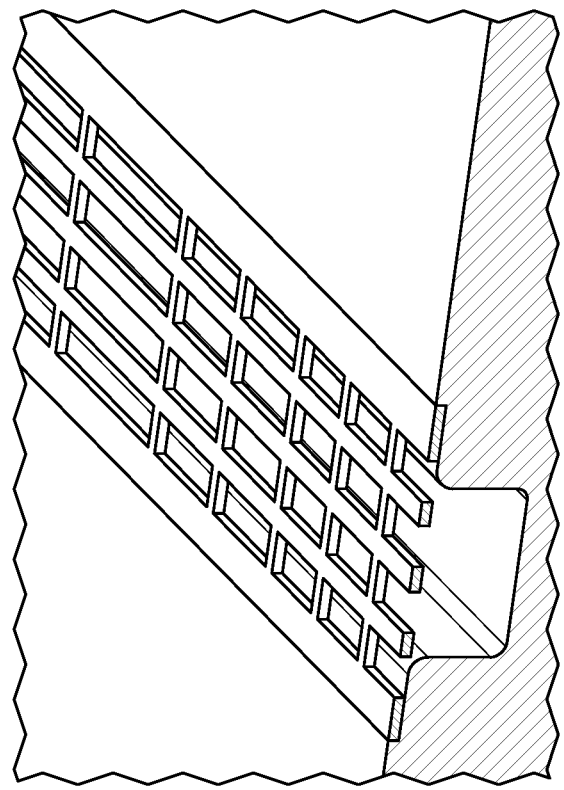
FIG. 25 is a top perspective view of another example of a cover plate for the curing tool assembly of FIG. 1.
Figure 24:
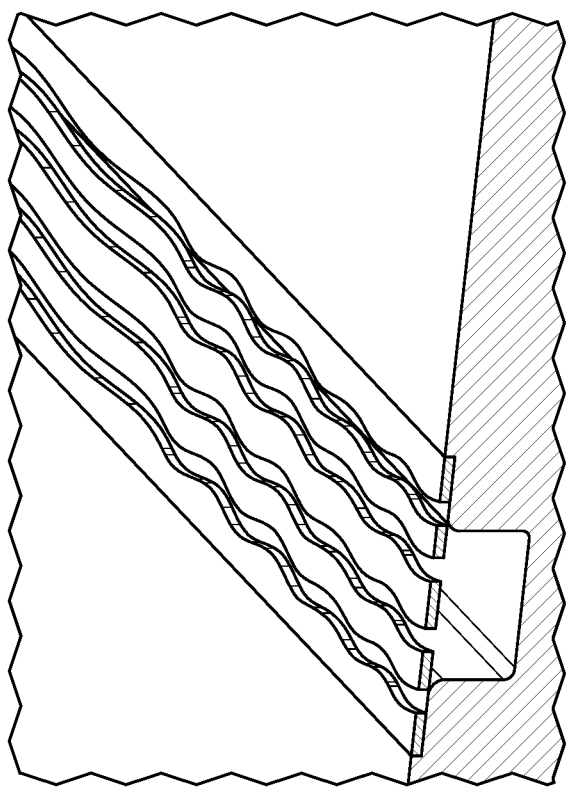
FIG. 24 is a top perspective view of still yet another example of a cover plate for the curing tool assembly of FIG. 1.
Figure 26A:
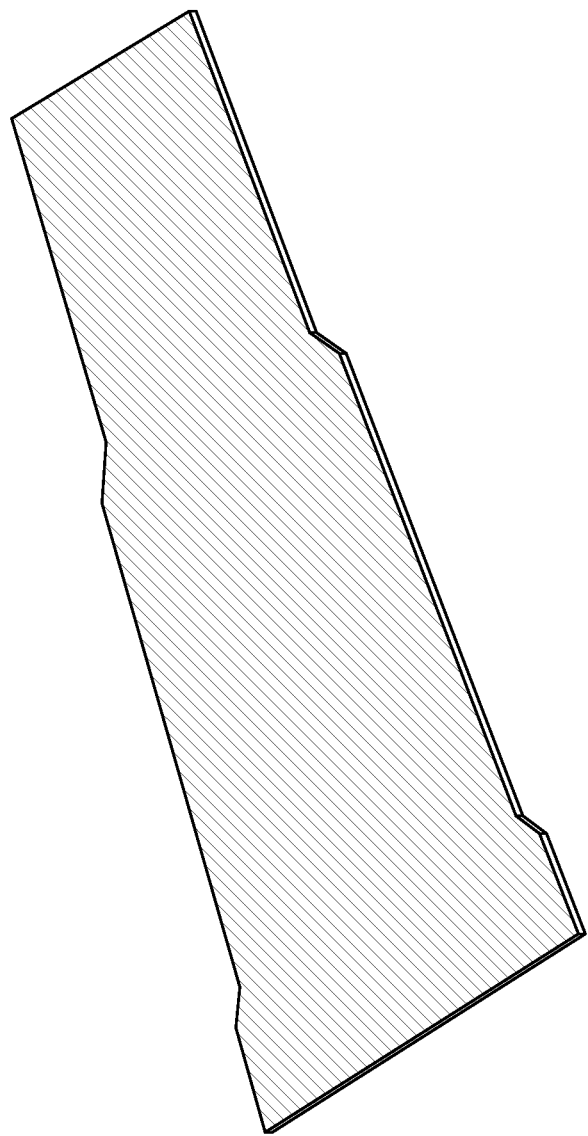
FIGS. 26A-D are top perspective views of a composite part showing stages of resin being infused into a dry fabric layup by modelling a composite manufacturing process.
Figure 26B:
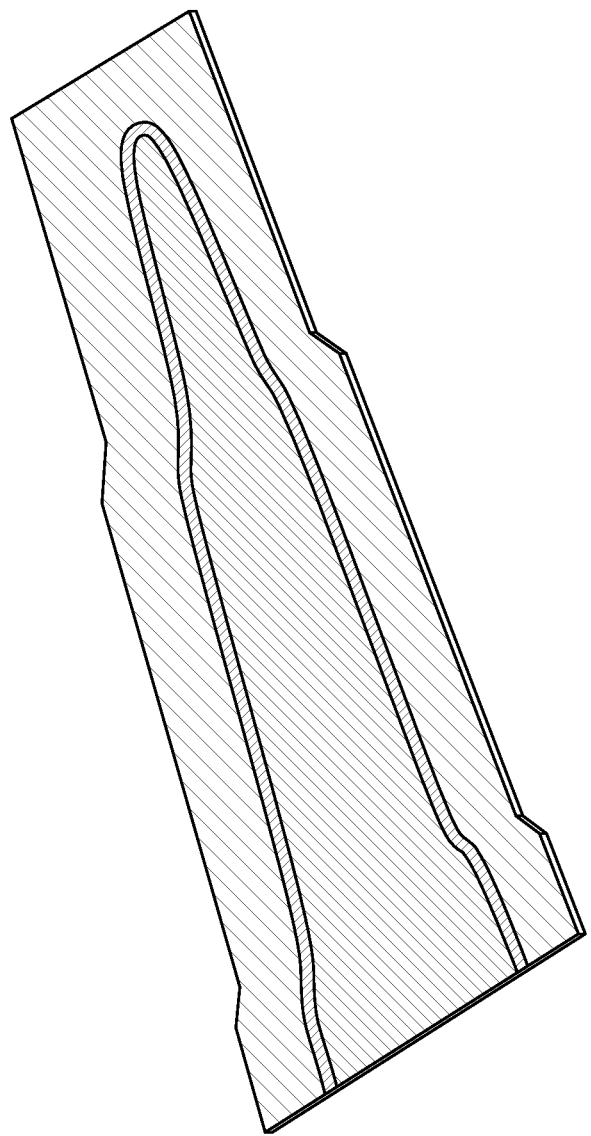
Figure 26C:
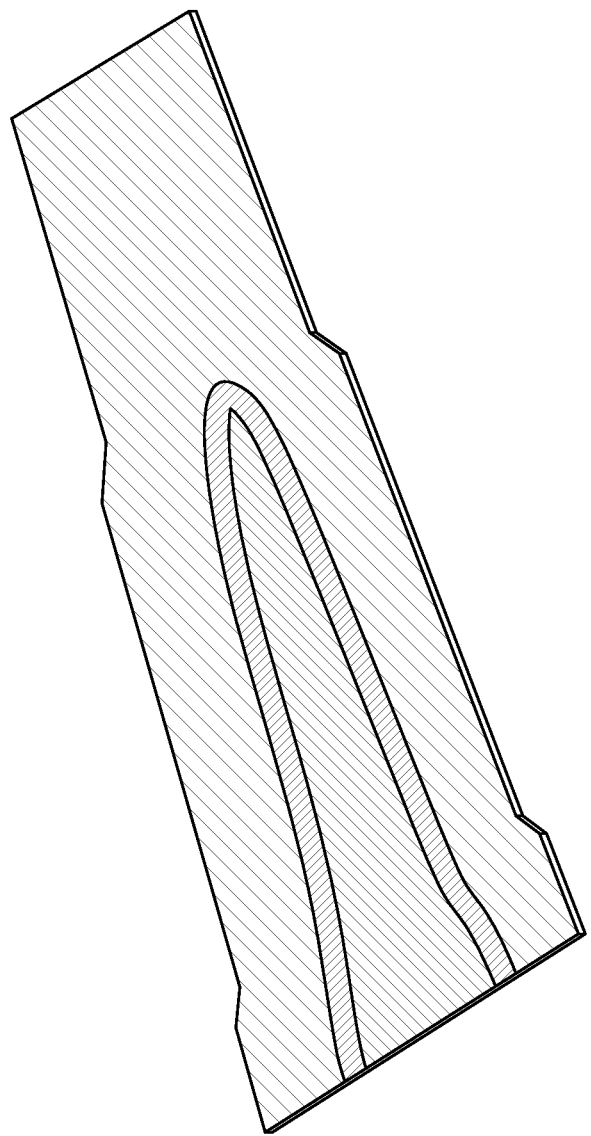
Figure 26D:
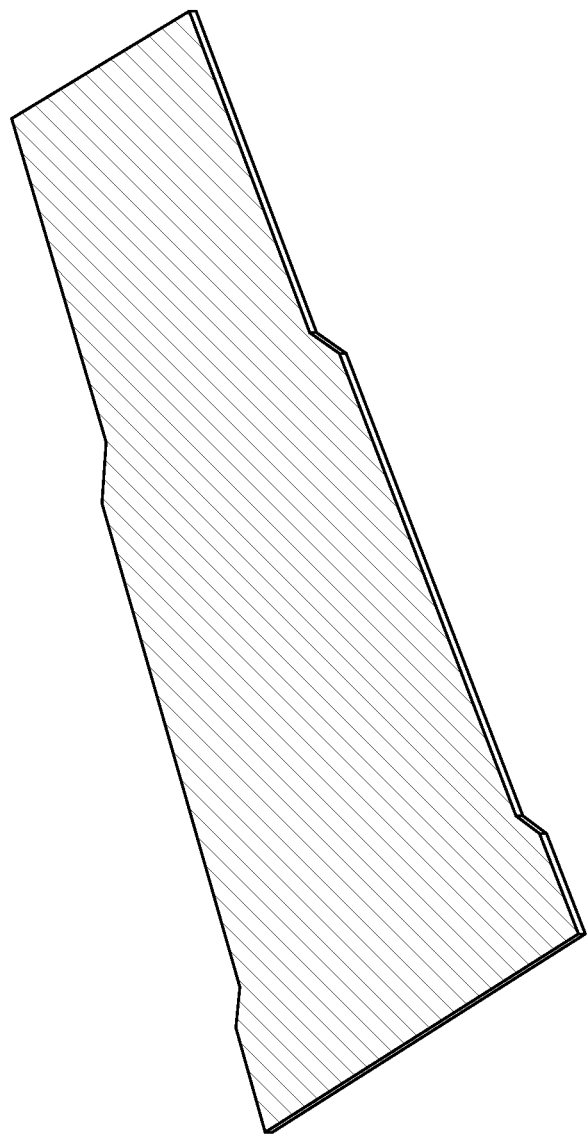

Referring generally to FIGS. 1-5, 14, 18, 19 and 26A-D, by way of examples, the present disclosure is directed to a method 1900 for composite manufacturing. FIGS. 1 and 18 disclose several examples of curing tool assemblies 100, 1800. FIGS. 2, 4 and 5 show examples of several types of the curing tool assembly 100 in cross-sectional views that cross a channel axis 106. FIG. 3 shows the curing tool assembly 100 in a cross-sectional view along the channel axis 106. FIG. 14 discloses an example of a system 1400 for composite manufacturing. FIG. 19 discloses the method 1900 for composite manufacturing. FIGS. 26A-D show top perspective views of stages of a model of a composite part where resin is being infused into a dry fabric layup 1404 during a composite manufacturing process. FIG. 26A depicts a first stage during the modelling that shows the dry fabric layup 1404 prior to resin infusion. FIG. 26B depicts a second stage during the modelling that shows resin infused into a first portion of the dry fabric layup 1404. FIG. 26C depicts a third stage during the modelling that shows resin infused into a larger portion of the dry fabric layup 1404. FIG. 26D depicts a fourth stage during the modelling that shows resin fully infused into the dry fabric layup 1404.

With reference again to FIGS. 1, 2, 14, 18 and 19, in one or more examples, a method 1900 for composite manufacturing includes positioning 1902 a dry fabric layup 1404 with pad-up regions 1405 on a tool surface 104 of a curing tool 102. The tool surface 104 defines a plurality of interconnected resin channels 202 with a channel width 206 and a channel axis 106. The plurality of interconnected resin channels 202 define strategic paths for distribution of resin to the dry fabric layup 1404. The dry fabric layup 1404 with the pad-up regions 1405 positioned over a plurality of cover plates 108 that overlay the plurality of interconnected resin channels 202. Each cover plate 108 having a plate width that extends beyond the channel width 206. Each cover plate 108 includes a plurality of openings 110 at least a portion of which extend beyond the channel width 206. The plurality of openings 110 in each cover plate 108 further define strategic paths for distribution of the resin to the dry fabric layup 1404. The plate width of the plurality of cover plates 108 is strategically wider at the pad-up regions 1405 than at other regions. At 1904, a fluid impervious layer 1406 opposing the tool surface 104 is positioned over the dry fabric layup 1404. At 1906, the fluid impervious layer 1406 is sealed on the tool surface 104 over the dry fabric layup 1404 to form a sealed volume between the fluid impervious layer 1406 and the tool surface 104. At 1908, a liquid resin from a resin source 1402 is supplied to the sealed volume. At 1910, a pressure differential is supplied to the sealed volume to flow the liquid resin from the resin source 1402 into the sealed volume. At 1912, the liquid resin in the sealed volume is directed to the plurality of interconnected resin channels 202 in response to the differential pressure. At 1914, the liquid resin is further directed from the plurality of interconnected resin channels 202 through the plurality of openings 110 in the plurality of cover plates 108 to the dry fabric layup 1404 with the pad-up regions 1405 in further response to the differential pressure.

With reference again to FIGS. 26A-D, a composite manufacturing process is modelled and sequential stages of resin infusion into a dry fabric layup 1404 are captured in the drawings. FIG. 26A shows the dry fabric layup 1404 prior to resin infusion. FIG. 26B shows resin infused into a first portion of the dry fabric layup 1404. FIG. 26C shows resin infused into a larger portion of the dry fabric layup 1404. FIG. 26D resin fully infused into the dry fabric layup 1404. The composite manufacturing model shows resin being infused into the dry fabric layup 1404. As a result of the resin channels 202 and the openings 110 in the cover plates 108, the resin wave front races along the edges of the dry fabric layup 1404 and gradually fills in the remainder. For example, FIG. 26D shows the dry fabric layup 1404 impregnated with resin. This composite manufacturing process can be used to infuse very long composite parts because it moves resin quickly before the resin viscosity begins to decrease below desired infusion levels. In various examples, the resin can travel long distances without significant pressure loss. Additional resin channels 202 may be added in pad-up regions 1403.

Figure 27:
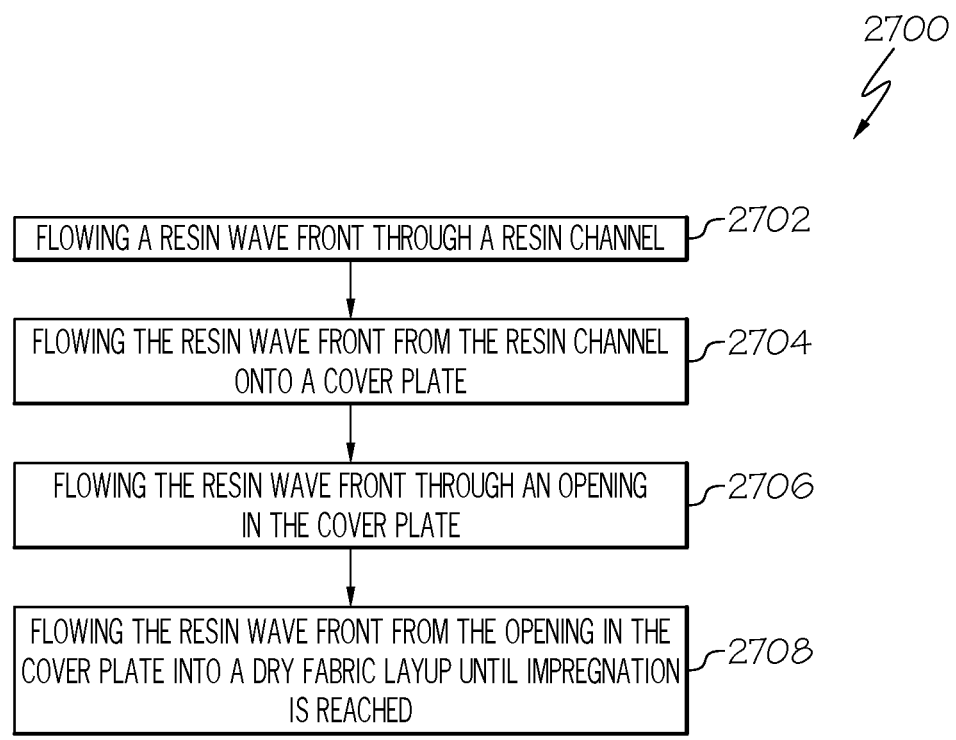
FIG. 27 is a flow diagram of yet another example of a method for composite manufacturing.

Referring generally to FIGS. 1, 2-5, 14 and 27, by way of examples, the present disclosure is directed to a method 2700 for composite manufacturing. FIG. 1 discloses an example of a curing tool assembly 100. FIGS. 2, 4 and 5 show examples of several types of the curing tool assembly 100 in cross-sectional views that cross a channel axis 106. FIG. 3 shows the curing tool assembly 100 in a cross-sectional view along the channel axis 106. FIG. 14 discloses an example of a system 1400 for composite manufacturing. FIG. 27 discloses the method 2700 for composite manufacturing.

With reference again to FIGS. 1, 2, 14 and 27, in one or more examples, a method 2700 for composite manufacturing includes flowing 2702 a resin wave front through a resin channel 202. At 2704, the resin wave front is flowed from the resin channel 202 onto a cover plate 108. At 2706, the resin wave front is flowed through an opening 110 in the cover plate 108. At 2708, the resin wave front is flowed from the opening 110 in the cover plate 108 into a dry fabric layup 1404 until impregnation is reached. In another example of the method 1700, the cover plate 108 includes a slotted cover and the opening 110 includes a slot. In yet another example of the method 1700, the dry fabric layup 1402 includes a dry preform.

Figure 7:
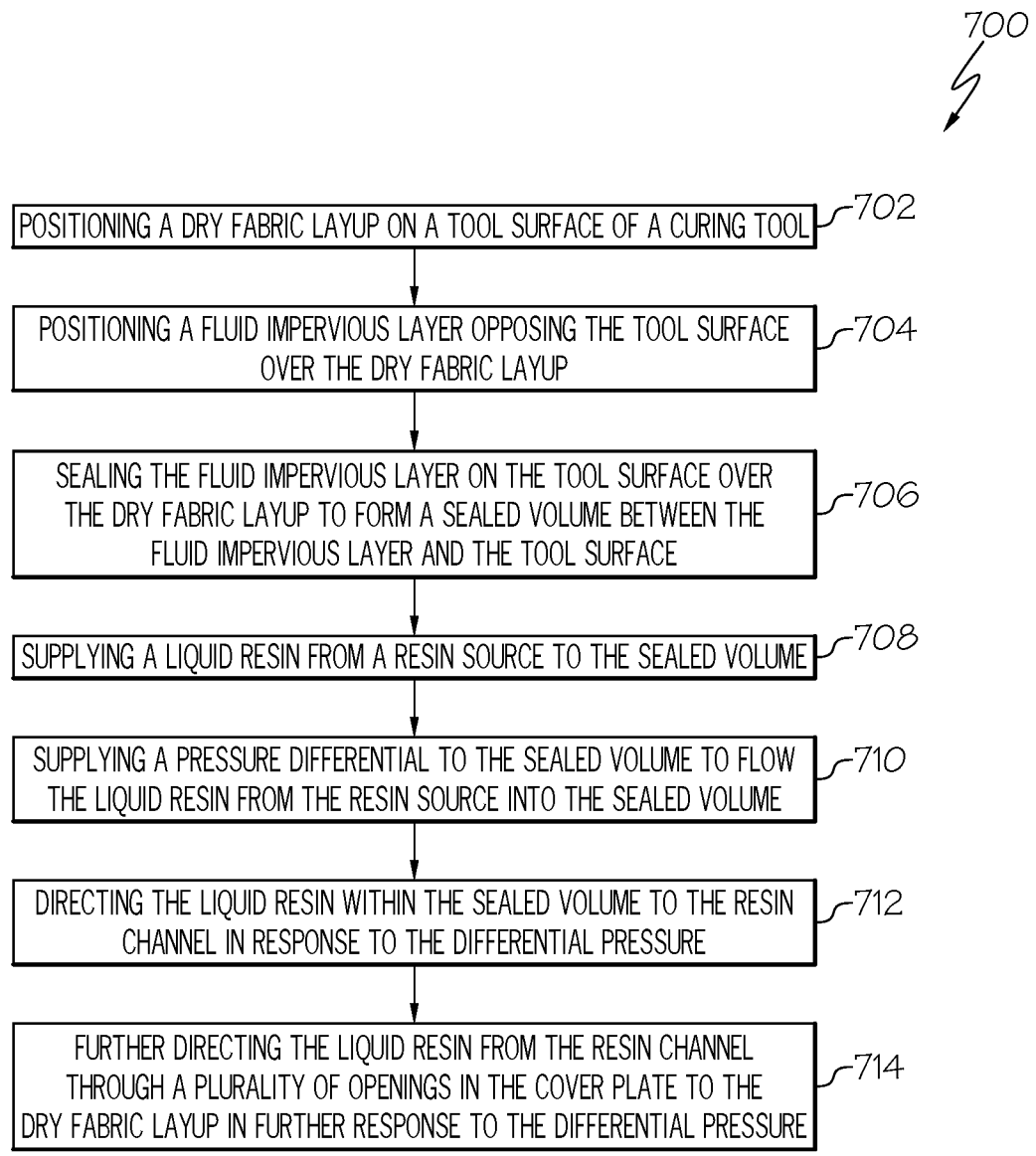
FIG. 7 is a flow diagram of an example of a method for composite manufacturing.
Figure 8A:
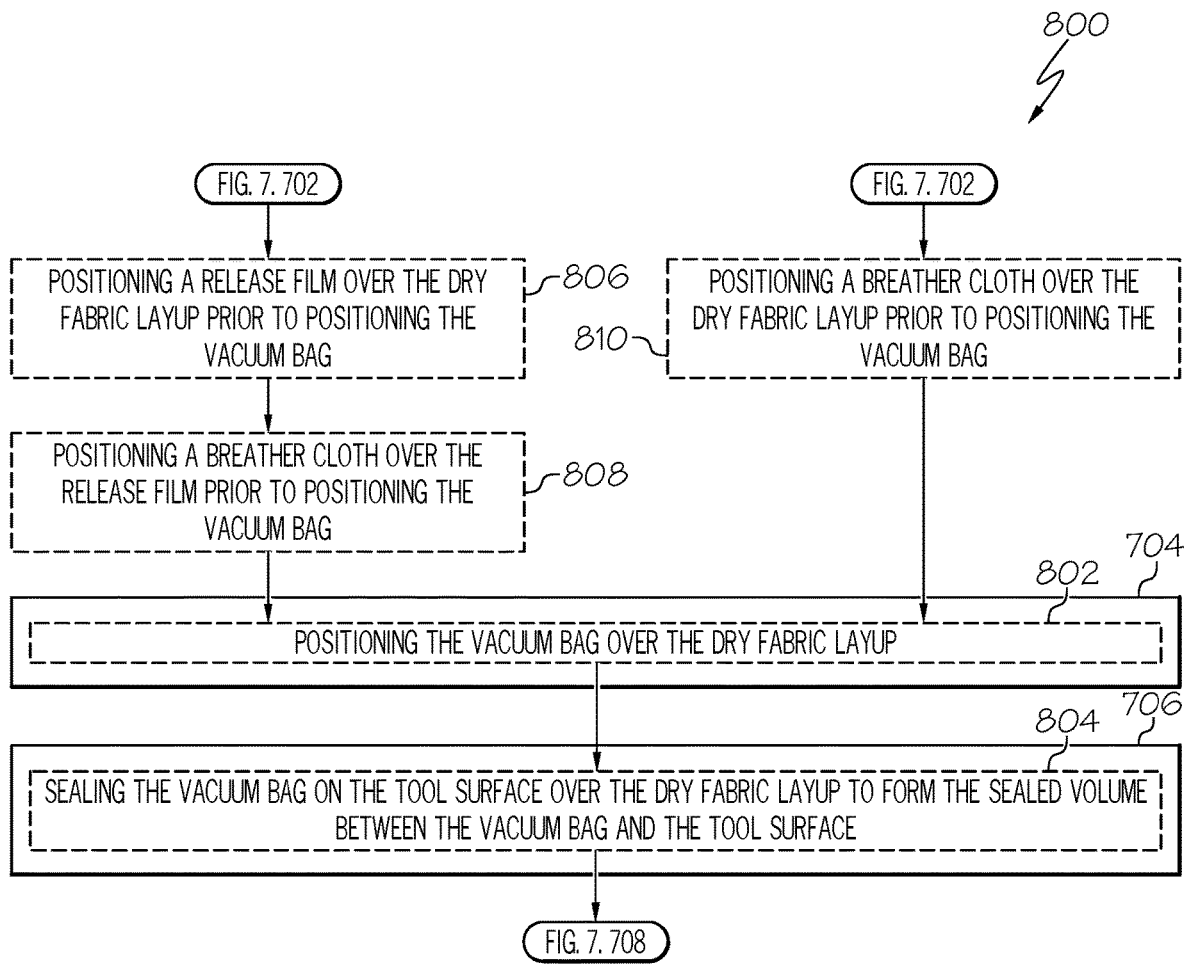
Figure 9:
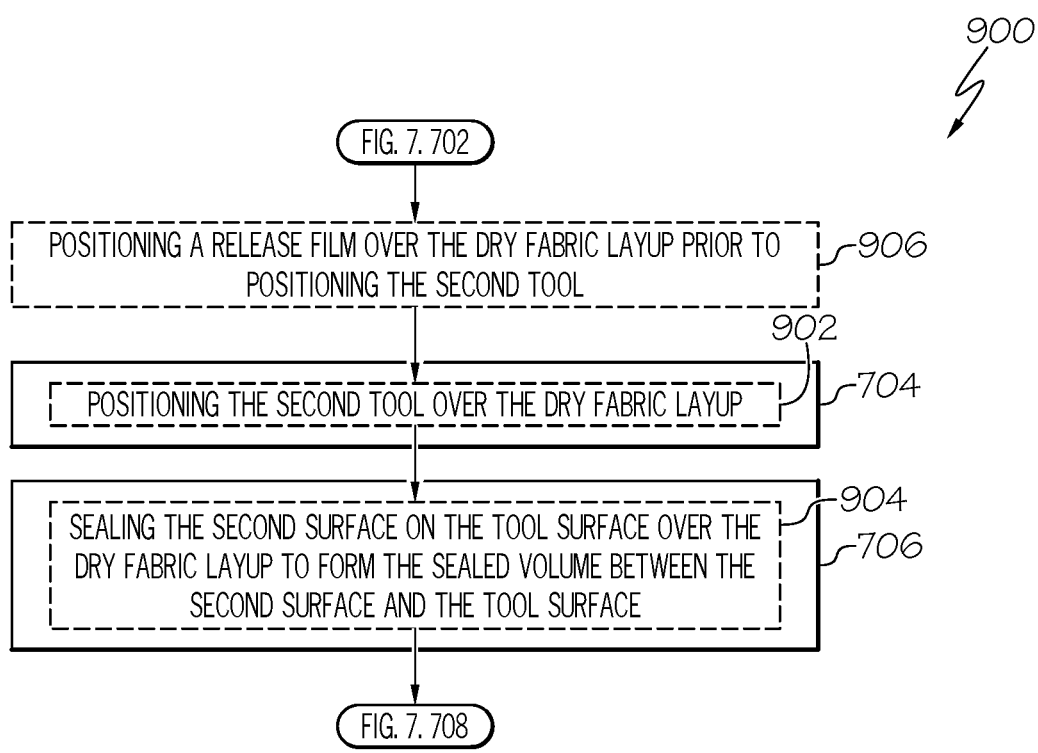
FIG. 9, in combination with FIG. 7, is a flow diagram of yet another example of a method for composite manufacturing.
Figure 10:
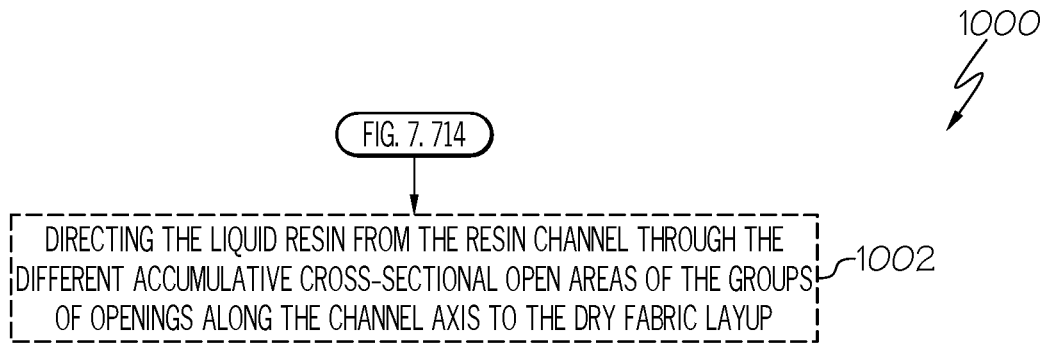
FIG. 10, in combination with FIG. 7, is a flow diagram of still another example of a method for composite manufacturing.
Figure 11:
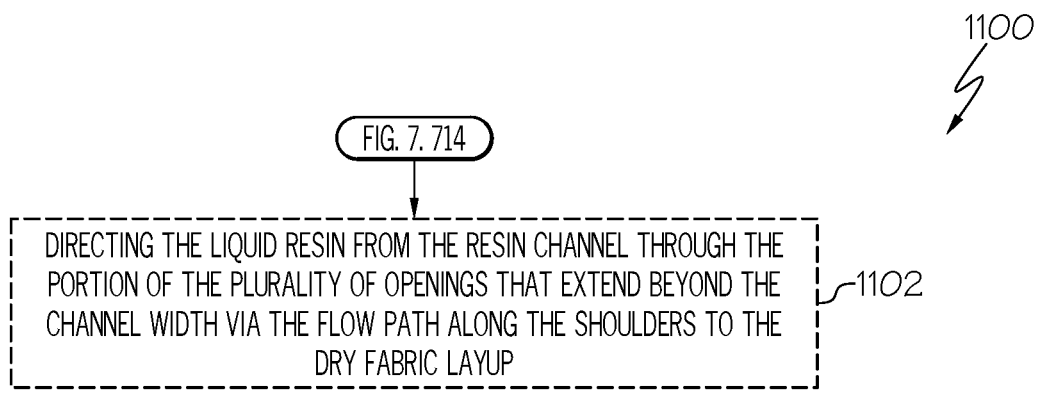
FIG. 11, in combination with FIG. 7, is a flow diagram of still yet another example of a method for composite manufacturing.
Figure 12:
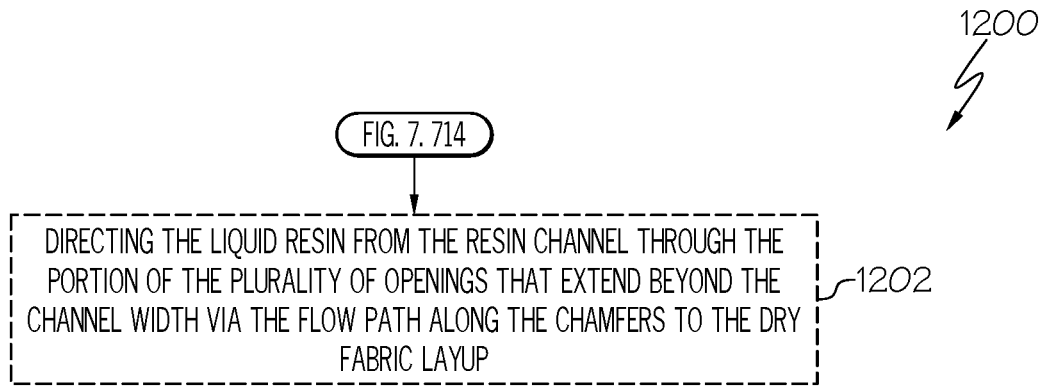
FIG. 12, in combination with FIG. 7, is a flow diagram of another example of a method for composite manufacturing.
Figure 13:
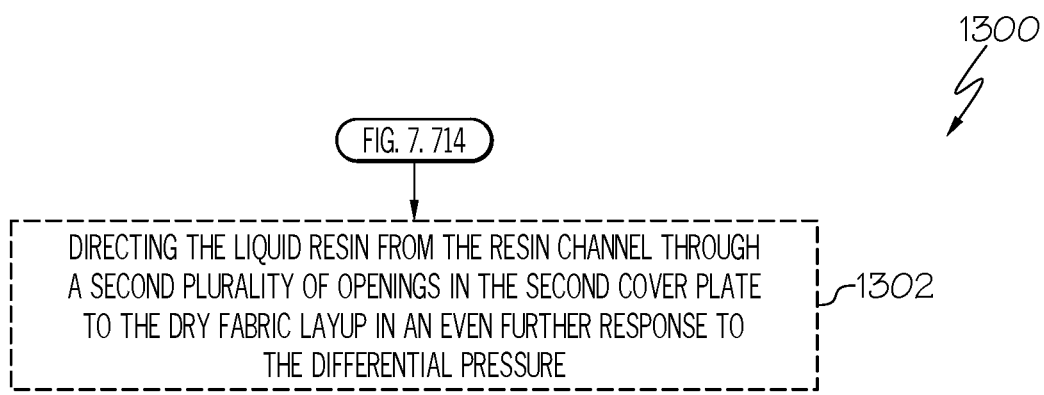
FIG. 13, in combination with FIG. 7, is a flow diagram of yet another example of a method for composite manufacturing.
Figure 15:
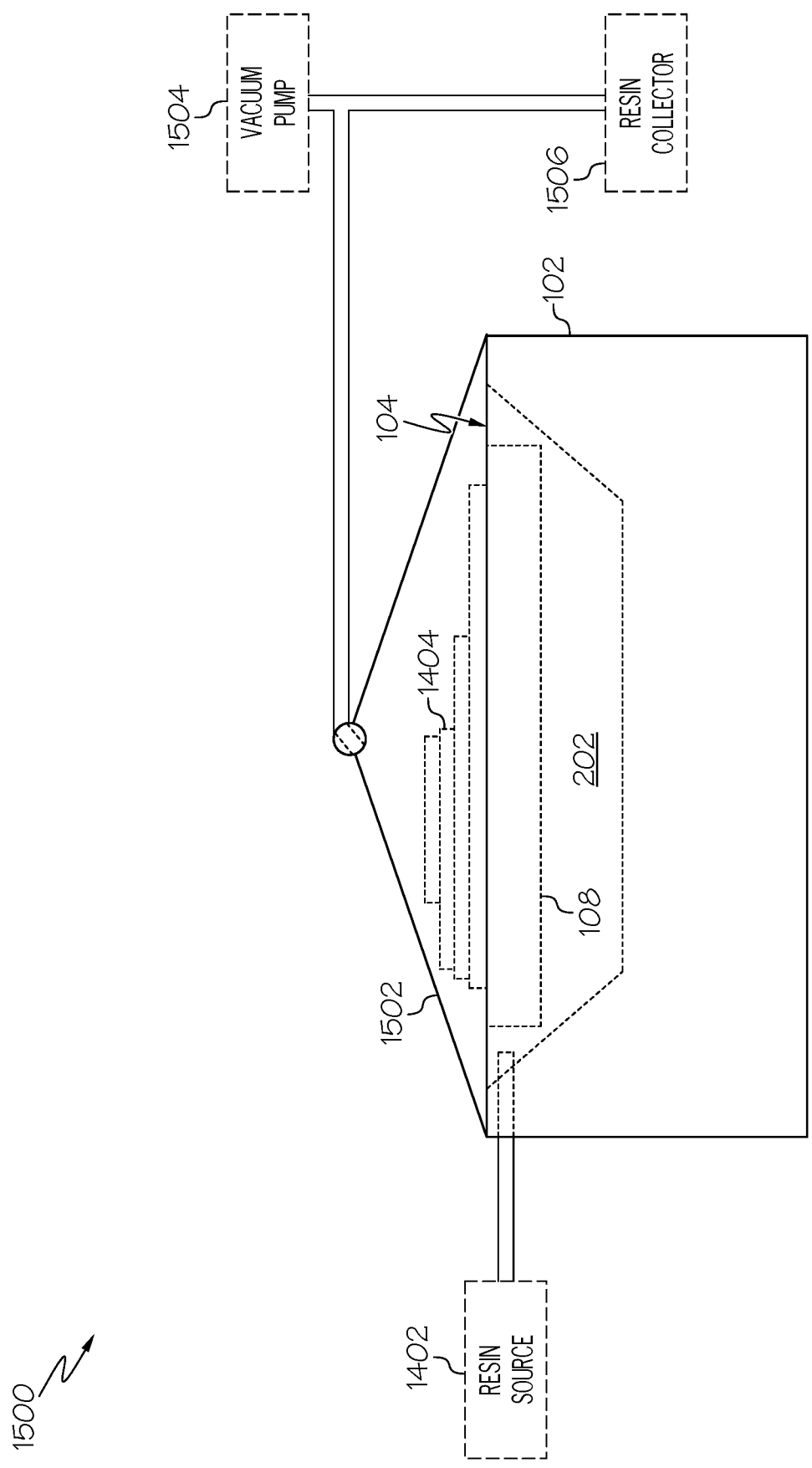
FIG. 15 is a functional diagram of another example of a system for composite manufacturing.
Figure 16:
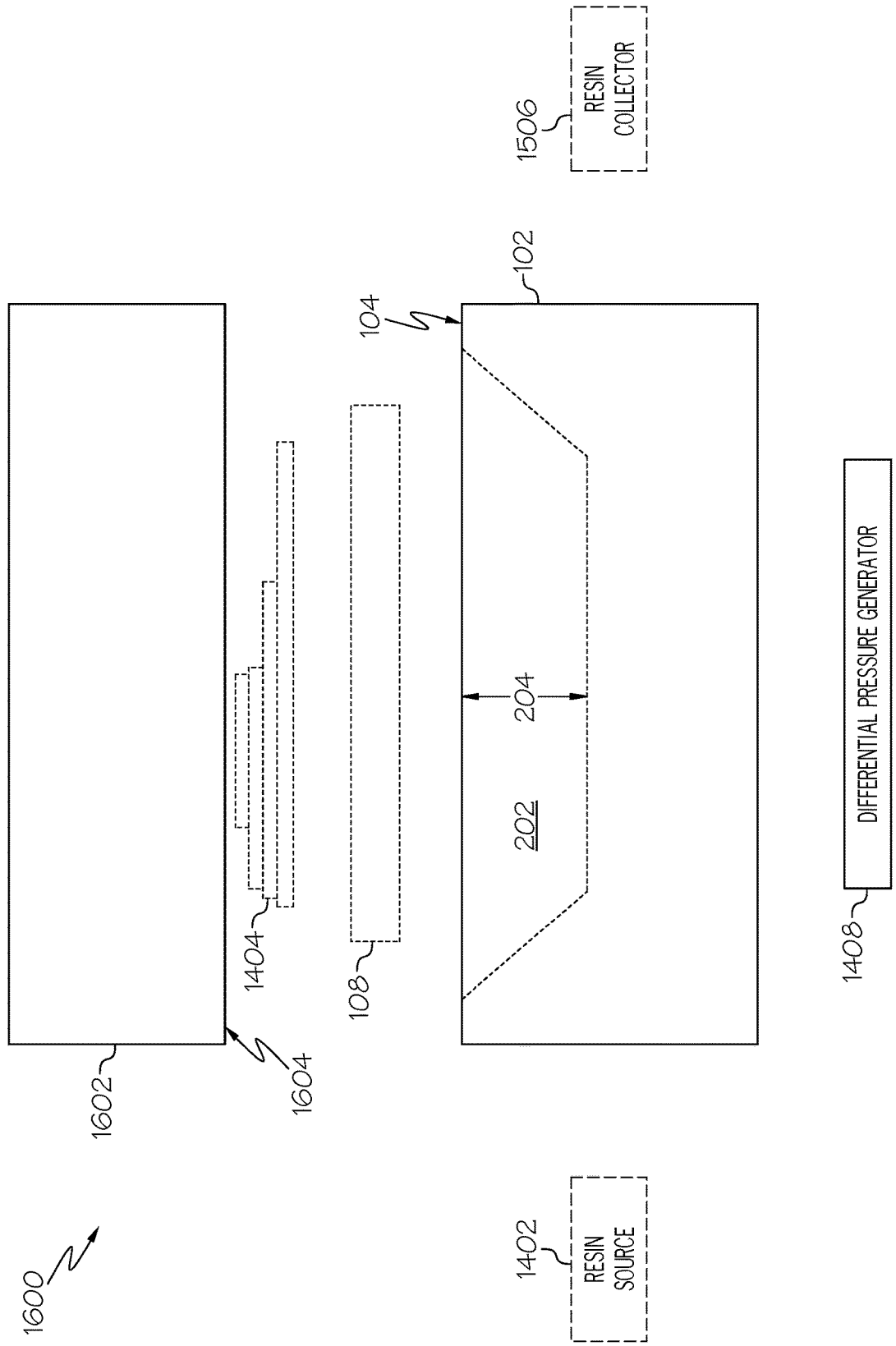
FIG. 16 is a functional diagram of yet another example of a system for composite manufacturing.
Figure 17:
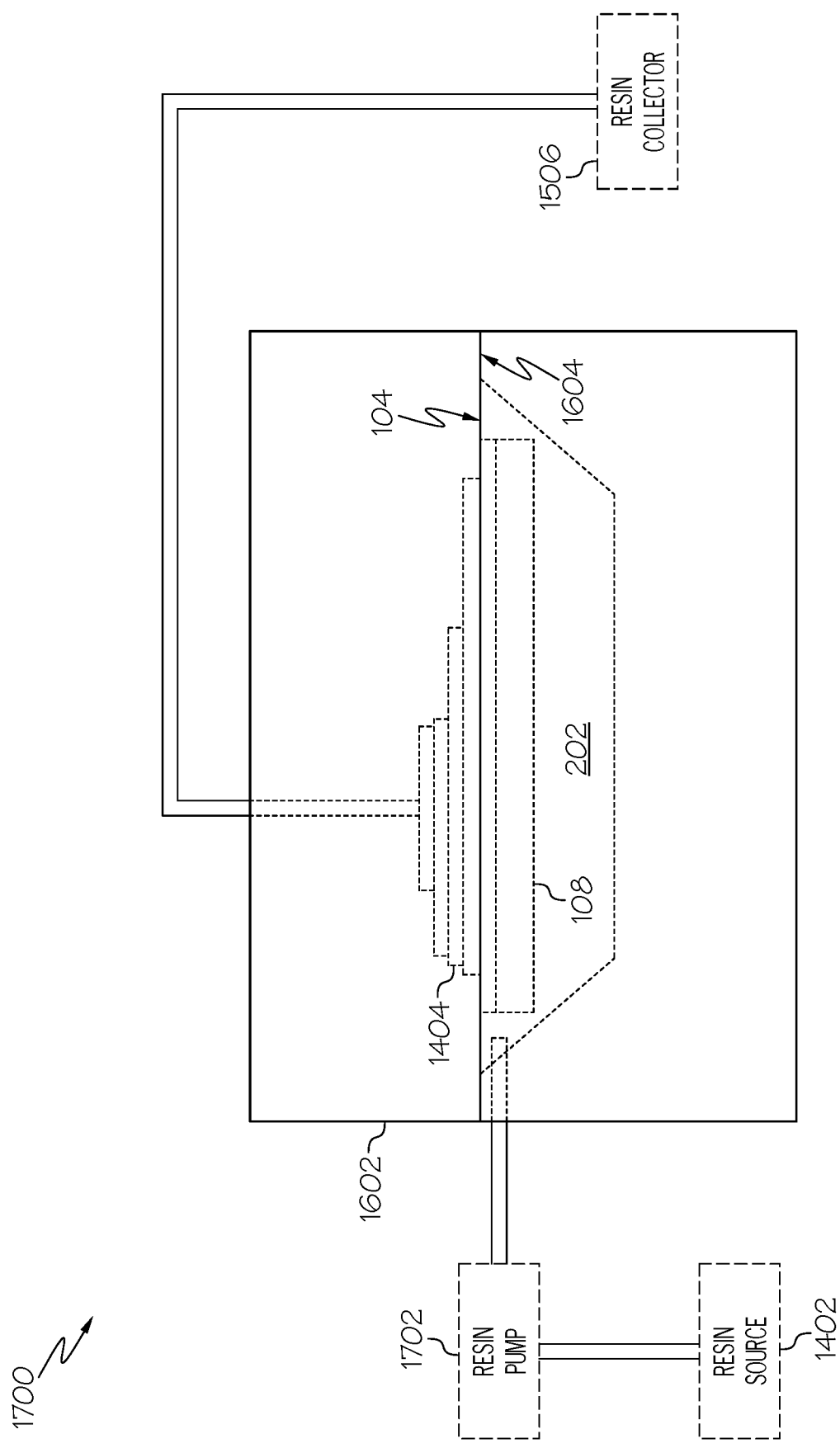
FIG. 17 is a functional block diagram of still another example of a system for composite manufacturing.

Referring generally to FIGS. 1-7, 8A-B, 9-11 and 14-16, by way of examples, the present disclosure is directed to methods 700, 800, 900, 1000, 1100, 1200, 1300 for composite manufacturing. FIG. 1 discloses an example of a curing tool assembly 100. FIGS. 2, 4 and 5 show examples of several types of the curing tool assembly 100 in cross-sectional views that cross a channel axis 106. FIG. 3 shows the curing tool assembly 100 in a cross-sectional view along the channel axis 106. FIG. 7 discloses the method 700 for composite manufacturing. FIGS. 8A-B discloses the method 800 for composite manufacturing. FIG. 9 discloses the method 900 for composite manufacturing. FIG. 10 discloses the method 1000 for composite manufacturing. FIG. 11 discloses the method 1100 for composite manufacturing. FIG. 12 discloses the method 1200 for composite manufacturing. FIG. 13 discloses the method 1300 for composite manufacturing. FIGS. 14-16 disclose several examples of systems 1400, 1500, 1600 for composite manufacturing.

With reference again to FIGS. 1, 2, 7 and 14, in one or more examples, a method 700 for composite manufacturing includes positioning 702 a dry fabric layup 1404 on a tool surface 104 of a curing tool 102. The tool surface 104 defines a resin channel 202 with a channel axis 106. The dry fabric layup 1404 positioned over a cover plate 108 that overlays the resin channel 202. At 704, a fluid impervious layer 1406 opposing the tool surface 104 is positioned over the dry fabric layup 1404. At 706, the fluid impervious layer 1406 is sealed on the tool surface 104 over the dry fabric layup 1404 to form a sealed volume between the fluid impervious layer 1406 and the tool surface 104. At 708, a liquid resin from a resin source 1402 is supplied to the sealed volume. At 710, a pressure differential is supplied to the sealed volume to flow the liquid resin from the resin source 1402 into the sealed volume. At 712, the liquid resin in the sealed volume is directed to the resin channel 202 in response to the differential pressure. At 714, the liquid resin is further directed from the resin channel 202 through a plurality of openings 110 in the cover plate 108 to the dry fabric layup 1404 in further response to the differential pressure. The plurality of openings 110 in the cover plate 108 arranged to provide different flow capacity through different portions of the cover plate 108 to corresponding portions of the dry fabric layup 1404. In another example of the method 700, the dry fabric layup 1404 includes a preform dry fabric layup. In a further example, the preform dry fabric layup includes a plurality of dry fabric plies that are tacked. In yet another example of the method 700, the dry fabric layup 1404 includes a stack of dry fabric plies. In a further example, the dry fabric plies in the stack are tacked.

With reference again to FIGS. 1, 2, 7, 8A-B, 14 and 15, in one or more examples of a method 800 for composite manufacturing, the fluid impervious layer 1406 includes a vacuum bag 1502 and the pressure differential is a vacuum. The method 800 includes the method 700 of FIG. 7 and positioning 704 includes positioning 802 the vacuum bag 1502 over the dry fabric layup 1404. Sealing 706 of FIG. 7 includes sealing 804 the vacuum bag 1502 on the tool surface 104 over the dry fabric layup 1404 to form the sealed volume between the vacuum bag 1502 and the tool surface 104. In another example, the method 800 also includes positioning 806 a release film 1410 over the dry fabric layup 1404 prior to positioning 802 the vacuum bag 1502. In a further example, the method 800 also includes positioning 808 a breather cloth 1412 over the release film 1410 prior to positioning 802 the vacuum bag 1502. In yet another example, the method 800 also includes positioning 810 a breather cloth 1412 over the dry fabric layup 1404 prior to positioning 802 the vacuum bag 1502.

In still another example, the method 800 also includes positioning 812 a release film 1410 over the tool surface 104 of the curing tool 102 prior to positioning 702 the dry fabric layup 1404 on the tool surface 104. The resin flows through the release film 1410 to the dry fabric layup 1404. In other examples, the release film 1410 may be referred to as a peel ply. In a further example, the method also includes positioning 814 a breather cloth 1412 over the release film 1410 prior to positioning 702 the dry fabric layup 1404. The resin flows through the release film 1410 and the breather cloth 1412 to the dry fabric layup 1404. In other examples, the breather cloth 1410 may be referred to as flow distribution media. In still yet another example, the method 800 also includes positioning 812 a breather cloth 1412 over the tool surface 104 of the curing tool 102 prior to positioning 702 the dry fabric layup 1404 on the tool surface 104.

With reference again to FIGS. 1, 7, 9, 14 and 16, in one or more examples of a method 900 for composite manufacturing, the fluid impervious layer 1406 includes a second tool 1602 with a second surface 1604 opposing the tool surface 104 of the curing tool 102 and the pressure differential is a positive pressure. The method 900 includes the method 700 of FIG. 7 and positioning 704 includes positioning 902 the second tool 1602 over the dry fabric layup 1404. Sealing 706 of FIG. 7 includes sealing 904 the second surface 1604 on the tool surface 104 over the dry fabric layup 1404 to form the sealed volume between the second surface 1604 and the tool surface 104. In another example, the method 900 also includes positioning 906 a release film 1410 over the dry fabric layup 1404 prior to positioning 902 the second tool 1602.

With reference again to FIGS. 1, 2, 7, 10 and 14, in one or more examples of a method 1000 for composite manufacturing, each opening 110 of the plurality of openings 110 defines a cross-sectional open area. Accumulative cross-sectional open areas are different for the different portions of the cover plate 108 along the channel axis 106 to provide differences in the flow capacity along the cover plate 108. Differences in the accumulative cross-sectional open areas of the different portions of the cover plate 108 are based on differences in the accumulative cross-sectional open areas of groups of openings 110 of the plurality of openings 110 along the channel axis 106. The method 1100 includes the method 700 of FIG. 7 and the further directing 714 of the liquid resin includes directing 1002 the liquid resin from the resin channel 202 through the different accumulative cross-sectional open areas of the groups of openings 110 along the channel axis 106 to the dry fabric layup 1404. In another example of the method 1000, the differences in the groups of openings 110 are based on differences in predetermined resin flow requirements at corresponding locations of the dry fabric layup 1404 in relation to molding a composite part.

With reference again to FIGS. 1, 2, 7 and 14, in one or more additional examples of the method 700 for composite manufacturing, at least one dimension of the plurality of openings 110 in the cover plate 108 is different along the channel axis 106. In a further example, differences in the at least one dimension of the plurality of openings 110 are based on differences in predetermined resin flow requirements at corresponding locations of the dry fabric layup 1404 in relation to molding a composite part.

In another example of the method 700, locations of the plurality of openings 110 in the cover plate 108 are different along the channel axis 106. In a further example, differences in the locations of the plurality of openings 110 are based on differences in predetermined resin flow requirements at corresponding locations of the dry fabric layup 1404 in relation to molding a composite part.

In yet another example of the method 700, shapes of the plurality of openings 110 in the cover plate 108 are different along the channel axis 106. In a further example, differences in the shapes of the plurality of openings 110 are based on differences in predetermined resin flow requirements at corresponding locations of the dry fabric layup 1404 in relation to molding a composite part. In another further example, at least a portion of the plurality of openings 110 includes curved slit openings defined by at least one curve radius, at least one width and at least one length.

In still another example of the method 700, pitches of sidewalls 208 of the plurality of openings 110 in the cover plate 108 are different along the channel axis 106. In a further example, differences in the pitches of the sidewalls 208 of the plurality of openings 110 are based on differences in predetermined resin flow requirements at corresponding locations of the dry fabric layup 1404 in relation to molding a composite part.

In still yet another example of the method 700, the resin channel 202 has a channel width 206 and the cover plate 108 has a plate width greater than the channel width 206. At least a portion of the plurality of openings 110 extend beyond the channel width 206.

With reference again to FIGS. 1, 2, 4, 7, 11 and 14, in one or more examples of a method 1100 for composite manufacturing, the resin channel 202 has a channel width 206 and the curing tool 102 includes shoulders 402 along both sides 210 of the resin channel 202 at the tool surface 104. The cover plate 108 provides a fluidic path from the resin channel 202 through a portion of the plurality of openings 110 that extends beyond the channel width 206 of the resin channel 202. The fluidic path is along the shoulders 402 and through the corresponding openings 110. The method 1100 includes the method 700 of FIG. 7 and the further directing 714 of the liquid resin includes directing 1102 the liquid resin from the resin channel 202 through the portion of the plurality of openings 110 that extend beyond the channel width 206 via the fluidic path along the shoulders 402 to the dry fabric layup 1404.

With reference again to FIGS. 1, 2, 5, 7, 12 and 14, in one or more examples of a method 1200 for composite manufacturing, the resin channel 202 has a channel width 206 and the curing tool 102 includes chamfers 502 along both sides 210 of the resin channel 202 at the tool surface 104. The cover plate 108 provides a fluidic path from the resin channel 202 through a portion of the plurality of openings 110 that extends beyond the channel width 206 of the resin channel 202. The fluidic path is along the chamfers 502 and through the corresponding openings 110. The method 1200 includes the method 700 of FIG. 7 and the further directing 714 of the liquid resin includes directing 1202 the liquid resin from the resin channel 202 through the portion of the plurality of openings 110 that extend beyond the channel width 206 via the fluidic path along the chamfers 502 to the dry fabric layup 1404.

With reference again to FIGS. 1, 2, 6, 7, 13 and 14, in one or more examples of a method 1200 for composite manufacturing, the dry fabric layup 1404 is also positioned over a second cover plate 602 that overlays a second portion of the resin channel 202 along the channel axis 106. The method 1200 includes the method 700 of FIG. 7 and the further directing 714 of the liquid resin includes directing 1302 the liquid resin from the resin channel 202 through a second plurality of openings 604 in the second cover plate 602 to the dry fabric layup 1404 in an even further response to the differential pressure. The second plurality of openings 604 arranged to provide different flow capacity through different portions of the second cover plate 602 along the channel axis 106. In another example of the method 1200, the cover plate 108 and the second cover plate 602 overlay different portions of the resin channel 202 along the channel axis 106. In yet another example of the method 1200, differences in the flow capacity through the different portions of the second cover plate 602 are based on differences in predetermined resin flow requirements at corresponding locations of the dry fabric layup 1404 in relation to molding a composite part.

Referring generally to FIGS. 1-6 and 14-17, by way of examples, the present disclosure is directed to a curing tool assembly 100 for composite manufacturing. FIGS. 1 and 6 disclose several examples of the curing tool assembly 100. FIGS. 2, 4 and 5 show examples of several types of the curing tool assembly 100 in cross-sectional views that cross a channel axis 106. FIG. 3 shows the curing tool assembly 100 in a cross-sectional view along the channel axis 106. FIGS. 14-17 disclose several examples of a system 1400, 1500, 1600, 1700 for the composite manufacturing.

With reference again to FIGS. 1, 2 and 14, in one or more examples, a system 1400 for composite manufacturing includes a curing tool 102, a cover plate 108, a fluid impervious layer 1406 and a differential pressure generator 1408. The curing tool 102 includes a tool surface 104 that defines a resin channel 202 with a channel axis 106. The resin channel 202 configured to receive a liquid resin from a resin source 1402. The cover plate 108 overlays at least a portion of the resin channel 202 along the channel axis 106. The cover plate 108 defines a plurality of openings 110 in fluidic communication with the resin channel 202. The plurality of openings 110 arranged to provide different flow capacity through different portions of the cover plate 108 along the channel axis 106. The cover plate 108 and the tool surface 104 configured to receive a dry fabric layup 1404. The fluid impervious layer 1406 opposing the tool surface 104 and configured to overlay the dry fabric layup 1404 after the dry fabric layup 1404 is positioned on the tool surface 104 and the cover plate 108. The fluid impervious layer 1406 configured to be sealed on the tool surface 104 over the dry fabric layup 1404 to form a sealed volume between the fluid impervious layer 1406 and the tool surface 104. The differential pressure generator 1408 configured to establish a differential pressure within the sealed volume to flow the liquid resin from the resin source 1402 into the sealed volume, configured to direct the liquid resin in the sealed volume to the resin channel 202 and configured to further direct the liquid resin from the resin channel 202 through the plurality of openings 110 in the cover plate 108 to the dry fabric layup 1404. The plurality of openings 110 arranged to provide the different flow capacity through the different portions of the cover plate 108 to corresponding portions of the dry fabric layup 1404.

With reference again to FIGS. 1, 2, 14 and 15, in one or more examples of a system 1500 for composite manufacturing, the pressure differential is a vacuum. The system 1500 includes the system 1400 of FIG. 14 and the fluid impervious layer 1406 includes a vacuum bag 1502 configured to overlay the dry fabric layup 1404 and configured to be sealed on the tool surface 104 over the dry fabric layup 1404 to form the sealed volume between the vacuum bag 1502 and the tool surface 104. In another example, the system 1500 also includes a release film 1410 configured to be positioned over the dry fabric layup 1404 prior to positioning the vacuum bag 1502 over the dry fabric layup 1404. In yet another example, the system 1500 also includes a breather cloth 1412 configured to be positioned over the dry fabric layup 1404 prior to positioning the vacuum bag 1502 over the dry fabric layup 1404. In still another example of the system 1500, the differential pressure generator 1408 includes a vacuum pump 1504 configured to establish the vacuum within the sealed volume between the vacuum bag 1502 and the tool surface 104 to flow the liquid resin from the resin source into the sealed volume, configured to direct the liquid resin in the sealed volume to the resin channel 202, configured to further direct the liquid resin from the resin channel 202 through the plurality of openings 110 in the cover plate 108 to the dry fabric layup 1404 and configured to direct resin waste from the sealed volume to a resin collector 1506.

With reference again to FIGS. 1, 2 and 14-17, in one or more examples of a system 1600 for composite manufacturing, the pressure differential is a positive pressure. The system 1600 includes the system 1400 of FIG. 14 and the fluid impervious layer 1406 includes a second tool 1602 with a second surface 1604 opposing the tool surface 104 of the curing tool 102. The second tool 1602 configured to overlay the dry fabric layup 1404 and the second surface 1604 is configured to be sealed on the tool surface 104 over the dry fabric layup 1404 to form the sealed volume between the second surface 1604 and the tool surface 104. In another example, the system 1600 also includes a release film 1410 configured to be positioned over the dry fabric layup 1404 prior to positioning the second tool 1602 over the dry fabric layup 1404. In yet another example of the system 1600, the differential pressure generator 1408 includes a resin pump 1702 configured to establish the positive pressure within the sealed volume between the second surface 1604 and the tool surface 104 to flow the liquid resin from the resin source into the sealed volume, configured to direct the liquid resin in the sealed volume to the resin channel 202, configured to further direct the liquid resin from the resin channel 202 through the plurality of openings 110 in the cover plate 108 to the dry fabric layup 1404 and configured to direct resin waste from the sealed volume to a resin collector 1506.

With reference again to FIGS. 1, 2, 4-6 and 14, in one or more examples of the system 1400 for composite manufacturing, each opening 110 of the plurality of openings 110 defines a cross-sectional open area. Accumulative cross-sectional open areas being different for the different portions of the cover plate 108 along the channel axis 106 to provide differences in the flow capacity along the cover plate 108. In another example of the system 1400, at least one dimension of the plurality of openings 110 in the cover plate 108 is different along the channel axis 106. In yet another example of the system 1400, locations of the plurality of openings 110 in the cover plate 108 are different along the channel axis 106. In still another example of the system 1400, shapes of the plurality of openings 110 in the cover plate 108 are different along the channel axis 106. In still yet another example of the system 1400, pitches of sidewalls 208 of the plurality of openings 110 in the cover plate 108 are different along the channel axis 106.

In another example of the system 1400, the resin channel 202 has a channel width 206 and the cover plate 108 has a plate width greater than the channel width 206, wherein at least a portion of the plurality of openings 110 extend beyond the channel width 206. In yet another example of the system 1400, the resin channel 202 has a channel width 206. In this example, the curing tool 102 includes shoulders 402 along both sides 210 of the resin channel 202 at the tool surface 104. The cover plate 108 provides a fluidic path from the resin channel 202 through a portion of the plurality of openings 110 that extends beyond the channel width 206 of the resin channel 202. The fluidic path being along the shoulders 402 and through the corresponding openings 110. The differential pressure generator 1408 is configured to direct the liquid resin from the resin channel 202 through the portion of the plurality of openings 110 that extend beyond the channel width 206 via the fluidic path along the shoulders 402 to the dry fabric layup 1404.

In still another example of the system 1400, the resin channel 202 has a channel width 206. In this example, the curing tool 102 includes chamfers 502 along both sides 210 of the resin channel 202 at the tool surface 104. The cover plate 108 provides a fluidic path from the resin channel 202 through a portion of the plurality of openings 110 that extends beyond the channel width 206 of the resin channel 202. The fluidic path being along the chamfers 502 and through the corresponding openings 110. The differential pressure generator 1408 is configured to direct the liquid resin from the resin channel 202 through the portion of the plurality of openings 110 that extend beyond the channel width 206 via the fluidic path along the chamfers 502 to the dry fabric layup 1404.

In still yet another example, the system 1400 also includes a second cover plate 602 configured to overlay a second portion of the resin channel 202 along the channel axis 106. The second cover plate 602 defines a second plurality of openings 604 in fluidic communication with the resin channel 202. The second plurality of openings 604 arranged to provide different flow capacity through different portions of the second cover plate 602 along the channel axis 106. In a further example, the cover plate 108 and the second cover plate 602 overlay different portions of the resin channel 202 along the channel axis 106. In another further example, differences in the flow capacity through the different portions of the second cover plate 602 are based on differences in predetermined resin flow requirements at corresponding locations of the dry fabric layup 1404 in relation to molding a composite part.

In another example, the system 1400 also includes a second cover plate 602 configured to overlay at least the portion of the resin channel 202 along the channel axis 106. The second cover plate 602 defines a second plurality of openings 604 in fluidic communication with the resin channel 202. The second plurality of openings 604 arranged to provide different flow capacity through different portions of the second cover plate 602 along the channel axis 106. In a further example, the cover plate 108 and the second cover plate 602 are interchangeable in relation to the curing tool 102 and the resin channel 202. In another further example, differences in the flow capacity through the different portions of the second cover plate 602 are based on differences in predetermined resin flow requirements at corresponding locations of a second dry fabric layup 1404 in relation to molding a second composite part.

Examples of curing tool assemblies 100, 1800, methods 700, 800, 900, 1000, 1100, 1200, 1300, 1900, 2700 and systems 1400, 1500, 1600, 1700 for composite manufacturing may be related to or used in the context of aircraft manufacturing. Although an aircraft example is described, the examples and principles disclosed herein may be applied to other products in the aerospace industry and other industries, such as the automotive industry, the space industry, the construction industry and other design and manufacturing industries. Accordingly, in addition to aircraft, the examples and principles disclosed herein may apply to the use of composite products in the manufacture of various types of vehicles and in the construction of various types of buildings.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic and/or operational step described in connection with the example is included in at least one aspect, embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item and/or, e.g., a "third" or higher-numbered item.

As used herein, the phrase "at least one of," when used with a list of items, means different combinations of one or more of the listed items may be used and only one of each item in the list may be needed. For example, "at least one of item A, item B and item C" may include, without limitation, item A or item A and item B. This example also may include item A, item B and item C or item B and item C. In other examples, "at least one of" may be, for example, without limitation, two of item A, one of item B and ten of item C; four of item B and seven of item C; and other suitable combinations. As used herein, the term "and/or" and the "/" symbol includes any and all combinations of one or more of the associated listed items.

As used herein, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1-6, 14-18 and 20-25, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features and/or components described and illustrated in FIGS. 1-6, 14-18 and 20-25, referred to above, need be included in every example and not all elements, features and/or components described herein are necessarily depicted in each illustrative example. Accordingly, some of the elements, features and/or components described and illustrated in FIGS. 1-6, 14-18 and 20-25 may be combined in various ways without the need to include other features described and illustrated in FIGS. 1-6, 14-18 and 20-25, other drawing figures and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1-6, 14-18 and 20-25, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features and/or components that serve a similar, or at least substantially similar, purpose are labeled with like numbers in each of FIGS. 1-6, 14-18 and 20-25 and such elements, features and/or components may not be discussed in detail herein with reference to each of FIGS. 1-6, 14-18 and 20-25. Similarly, all elements, features and/or components may not be labeled in each of FIGS. 1-6, 14-18 and 20-25, but reference numerals associated therewith may be utilized herein for consistency.

In FIGS. 7, 8A-B, 9-13 and 19, referred to above, the blocks may represent operations, steps and/or portions thereof and lines connecting the various blocks do not imply any particular order or dependency of the operations or portions thereof. It will be understood that not all dependencies among the various disclosed operations are necessarily represented. FIGS. 7, 8A-B, 9-13 and 19 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages and similar language used throughout the present disclosure may, but does not necessarily, refer to the same example.

Figure 28:
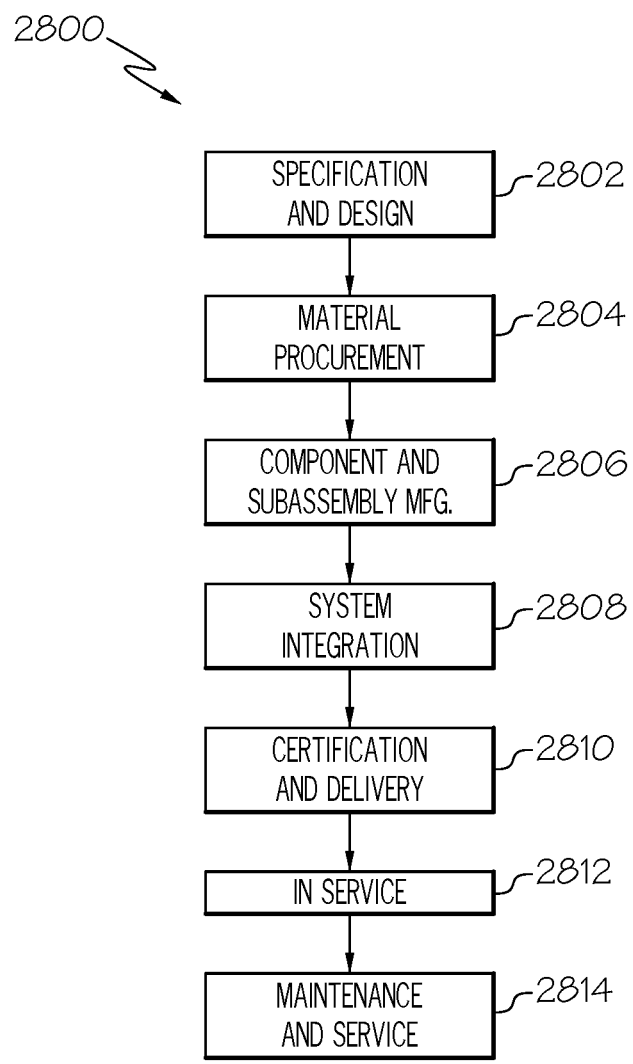
FIG. 28 is a block diagram of aircraft production and service methodology the implements one or more of the examples of methods for composite manufacturing disclosed herein.
Figure 29:
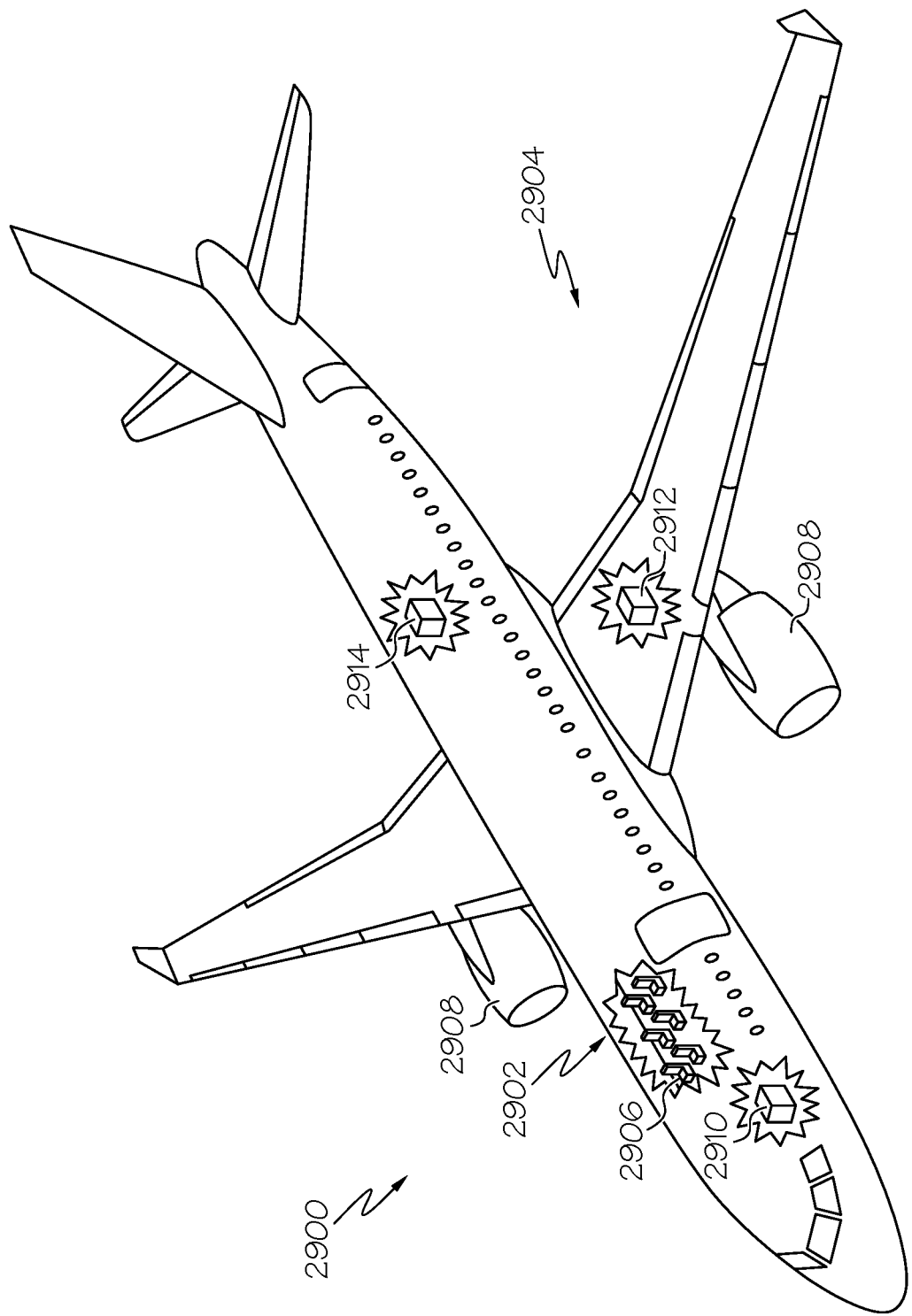
FIG. 29 is a schematic illustration of an aircraft that incorporates one or more part produced using one or more of the examples of curing tool assemblies, methods and systems for composite manufacturing disclosed herein.

Examples of the subject matter disclosed herein may be described in the context of aircraft manufacturing and service method 2800 as shown in FIG. 28 and aircraft 2900 as shown in FIG. 29. In one or more examples, the disclosed methods and systems for associating test data for a part under test with an end item coordinate system may be used in aircraft manufacturing. During pre-production, the service method 2800 may include specification and design (block 2802) of aircraft 2900 and material procurement (block 2804). During production, component and subassembly manufacturing (block 2806) and system integration (block 2808) of aircraft 2900 may take place. Thereafter, aircraft 2900 may go through certification and delivery (block 2810) to be placed in service (block 2812). While in service, aircraft 2900 may be scheduled for routine maintenance and service (block 2814). Routine maintenance and service may include modification, reconfiguration, refurbishment, etc. of one or more systems of aircraft 2900.

Each of the processes of the service method 2800 may be performed or carried out by a system integrator, a third party and/or an operator (e.g., a customer). For the purposes of this description, a system integrator may include, without limitation, any number of aircraft manufacturers and major-system subcontractors; a third party may include, without limitation, any number of vendors, subcontractors and suppliers; and an operator may be an airline, leasing company, military entity, service organization and so on.

As shown in FIG. 29, aircraft 2900 produced by the service method 2800 may include airframe 2902 with a plurality of high-level systems 2904 and interior 2906. Examples of high-level systems 2904 include one or more of propulsion system 2908, electrical system 2910, hydraulic system 2912 and environmental system 2914. Any number of other systems may be included. Although an aerospace example is shown, the principles disclosed herein may be applied to other industries, such as the automotive industry. Accordingly, in addition to aircraft 2900, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 2800. For example, components or subassemblies corresponding to component and subassembly manufacturing (block 2806) may be fabricated or manufactured in a manner similar to components or subassemblies produced while aircraft 2900 is in service (block 2812). Also, one or more examples of the system(s), method(s), or combination thereof may be utilized during production stages (block 2806 and block 2808), for example, by substantially expediting assembly of or reducing the cost of aircraft 2900. Similarly, one or more examples of the system or method realizations, or a combination thereof, may be utilized, for example and without limitation, while aircraft 2900 is in service (block 2812) and/or during maintenance and service (block 2814).

The described features, advantages and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the curing tool assemblies 100, 1800, methods 700, 800, 900, 1000, 1100, 1200, 1300, 1900, 2700 and systems 1400, 1500, 1600, 1700 for composite manufacturing have been shown and described, modifications may occur to those skilled in the art upon reading the specification. The present application includes such modifications and is limited only by the scope of the claims.

What is claimed is:

1. A curing tool assembly for composite manufacturing, comprising:
   a curing tool comprising a tool surface defining a resin channel having a channel axis;
   a cover plate overlaying at least a portion of the resin channel along the channel axis, the cover plate defining a plurality of openings in fluidic communication with the resin channel, the plurality of openings arranged to provide different flow capacity through different portions of the cover plate along the channel axis;
   a fluid impervious layer sealable against the curing tool to define a sealed volume between the fluid impervious layer and the tool surface; and
   a differential pressure generator configured to establish a differential pressure within the sealed volume.

2. The curing tool assembly of claim 1 wherein each opening of the plurality of openings defines a cross-sectional open area, accumulative cross-sectional open areas being different for the different portions of the cover plate along the channel axis to provide differences in the flow capacity along the cover plate.

3. The curing tool assembly of claim 2 wherein differences in the accumulative cross-sectional open areas of the different portions of the cover plate are based on differences in the accumulative cross-sectional open areas of groups of openings of the plurality of openings along the channel axis.

4. The curing tool assembly of claim 1 wherein at least one dimension of the plurality of openings in the cover plate is different along the channel axis.

5. The curing tool assembly of claim 4 wherein the at least one dimension of the plurality of openings is different by at least one of a width, a length, an angle, a diameter and a depth.

6. The curing tool assembly of claim 1 wherein locations of the plurality of openings in the cover plate are different along the channel axis.

7. The curing tool assembly of claim 1 wherein shapes of the plurality of openings in the cover plate are different along the channel axis.

8. The curing tool assembly of claim 1 wherein pitches of sidewalls of the plurality of openings in the cover plate are different along the channel axis.

9. The curing tool assembly of claim 1 wherein a spacing between adjacent openings of the plurality of openings exceeds approximately 0.0375 inches.

10. The curing tool assembly of claim 1 wherein the resin channel has a channel depth that ranges from at least one of approximately 0.15 inches to approximately 0.60 inches, approximately 0.20 inches to approximately 0.50 inches, approximately 0.25 inches to approximately 0.45 inches and approximately 0.30 inches to approximately 0.40 inches.

11. The curing tool assembly of claim 1 wherein the resin channel has a channel width that ranges from at least one of approximately 0.20 inches to approximately 0.80 inches, approximately 0.30 inches to approximately 0.70 inches and approximately 0.40 inches to approximately 0.60 inches.

12. The curing tool assembly of claim 1 wherein the resin channel has a channel width and the cover plate has a plate width greater than the channel width, wherein at least a portion of the plurality of openings extend beyond the channel width.

13. The curing tool assembly of claim 1 wherein the curing tool comprises shoulders along both sides of the resin channel at the tool surface for aligning the cover plate with the resin channel.

14. The curing tool assembly of claim 1 wherein the curing tool comprises chamfers along both sides of the resin channel at the tool surface for aligning the cover plate with the resin channel.

15. The curing tool assembly of claim 1, further comprising:
a second cover plate configured to overlay a second portion of the resin channel along the channel axis, the second cover plate defining a second plurality of openings in fluidic communication with the resin channel, the second plurality of openings arranged to provide different flow capacity through different portions of the second cover plate along the channel axis.

16. The curing tool assembly of claim 1, further comprising:
a second cover plate configured to overlay at least the portion of the resin channel along the channel axis, the second cover plate defining a second plurality of openings in fluidic communication with the resin channel, the second plurality of openings arranged to provide different flow capacity through different portions of the second cover plate along the channel axis.

17. A method for composite manufacturing, comprising:
positioning a dry fabric layup on a tool surface of a curing tool, the tool surface defining a resin channel having a channel axis, the dry fabric layup positioned over a cover plate that overlays the resin channel;
positioning a fluid impervious layer opposing the tool surface over the dry fabric layup;
sealing the fluid impervious layer on the tool surface over the dry fabric layup to form a sealed volume between the fluid impervious layer and the tool surface;
supplying a liquid resin from a resin source to the sealed volume;
supplying a pressure differential to the sealed volume to flow the liquid resin from the resin source into the sealed volume;
directing the liquid resin in the sealed volume to the resin channel in response to the differential pressure; and
further directing the liquid resin from the resin channel through a plurality of openings in the cover plate to the dry fabric layup in further response to the differential pressure, the plurality of openings in the cover plate arranged to provide different flow capacity through different portions of the cover plate to corresponding portions of the dry fabric layup.

18. The method of claim 17 wherein the fluid impervious layer comprises a vacuum bag and the pressure differential is a vacuum, the method further comprising:
positioning the vacuum bag over the dry fabric layup; and
sealing the vacuum bag on the tool surface over the dry fabric layup to form the sealed volume between the vacuum bag and the tool surface.

19. The method of claim 18, further comprising:
positioning a release film over the dry fabric layup prior to positioning the vacuum bag.

20. A system for composite manufacturing, comprising:
a resin source comprising a liquid resin;
a curing tool comprising a tool surface defining a resin channel having a channel axis, the resin channel configured to receive the liquid resin from the resin source;
a cover plate overlaying at least a portion of the resin channel along the channel axis, the cover plate defining a plurality of openings in fluidic communication with the resin channel, the plurality of openings arranged to provide different flow capacity through different portions of the cover plate along the channel axis, the cover plate and the tool surface configured to receive a dry fabric layup;
a fluid impervious layer opposing the tool surface and configured to overlay the dry fabric layup after the dry fabric layup is positioned on the tool surface and the cover plate, the fluid impervious layer configured to be sealed on the tool surface over the dry fabric layup to form a sealed volume between the fluid impervious layer and the tool surface; and
a differential pressure generator configured to establish a differential pressure within the sealed volume to flow the liquid resin from the resin source into the sealed volume, configured to direct the liquid resin in the sealed volume to the resin channel and configured to further direct the liquid resin from the resin channel through the plurality of openings in the cover plate to the dry fabric layup, the plurality of openings arranged to provide the different flow capacity through the different portions of the cover plate to corresponding portions of the dry fabric layup.

* * * * *